(12) United States Patent
Smithwick et al.

(10) Patent No.: US 10,379,494 B2
(45) Date of Patent: Aug. 13, 2019

(54) SCANNED COARSE INTEGRAL HOLOGRAPHIC DISPLAY HAVING HOLOGRAPHIC LENSLETS DISPLAYED BY SPATIAL LIGHT MODULATOR

(71) Applicant: DISNEY ENTERPRISES, INC., Burbank, CA (US)

(72) Inventors: Quinn Y. Smithwick, Pasadena, CA (US); Daping Chu, Cambridge (GB); Jhen-Si Chen, Cambridge (GB)

(73) Assignees: DISNEY ENTERPRISES, INC., Burbank, CA (US); CAMBRIDGE ENTERPRISE LIMITED, Cambridge (GB)

( * ) Notice: Subject to any disclaimer, the term of this patent is extended or adjusted under 35 U.S.C. 154(b) by 340 days.

(21) Appl. No.: 15/233,053

(22) Filed: Aug. 10, 2016

(65) Prior Publication Data
US 2018/0046140 A1    Feb. 15, 2018

(51) Int. Cl.
*G02B 26/10* (2006.01)
*G03H 1/22* (2006.01)
(Continued)

(52) U.S. Cl.
CPC ......... *G03H 1/2205* (2013.01); *G02B 26/101* (2013.01); *G02B 26/106* (2013.01);
(Continued)

(58) Field of Classification Search
CPC .. G02B 26/101; G02B 26/105; G02B 26/106; G02B 27/1066; G03H 27/0103; G03H 2027/0105; G03H 2027/0109; G03H 27/22–26; G03H 2001/0088; G03H 1/2205; G03H 2001/2292; G03H 1/2294; G03H 1/268; G03H 1/2685; G03H 2001/269; G03H 2001/2695;
(Continued)

(56) References Cited

U.S. PATENT DOCUMENTS

2009/0153571 A1* 6/2009 Crow ............... G06F 9/4812
                                                        345/506
2010/0079831 A1    4/2010 Renaud-Goud
(Continued)

*Primary Examiner* — Stephone B Allen
*Assistant Examiner* — Ryan S Dunning
(74) *Attorney, Agent, or Firm* — Marsh Fischmann & Breyfogle LLP; Kent A. Lembke

(57) ABSTRACT

A holographic display system for generating a super hologram with full parallax in different fields of view in the horizontal and vertical directions. The display system includes assemblies or subsystems each adapted to combine holographic displays and coarse integral displays to produce or display a coarse integral hologram. Briefly, the display system described herein teaches techniques for enhancing operations of coarse integral holographic (CIH) displays. The enhanced CIH displays may utilize ganged scanners, may operate scanners to provide boustrophedon scanning, may be configured to add color information such by view sequential color hologram display and scanning, may replace or supplement X-Y scanning abilities with a resonant scanner, and may replace physical lenslet arrays by generating and displaying a holographic lenslet for each elemental hologram used to create the super hologram.

13 Claims, 10 Drawing Sheets

(51) Int. Cl.
*G03H 1/26* (2006.01)
*G02B 27/10* (2006.01)

(52) U.S. Cl.
CPC ....... *G03H 1/2294* (2013.01); *G02B 27/1066* (2013.01); *G03H 1/268* (2013.01); *G03H 2001/221* (2013.01); *G03H 2001/2239* (2013.01); *G03H 2001/2292* (2013.01); *G03H 2001/2297* (2013.01); *G03H 2210/36* (2013.01); *G03H 2223/19* (2013.01)

(58) Field of Classification Search
CPC ........... G03H 2223/19; G03H 2225/61; G03H 2001/2685; H04N 13/189; H04N 13/194
USPC ............. 359/9, 13, 22, 23, 35, 197.1, 201.1, 359/201.2, 202.1, 203.1, 212.1, 213.1, 359/214.1, 464, 466, 467, 471, 472
See application file for complete search history.

(56) References Cited

U.S. PATENT DOCUMENTS

| | | |
|---|---|---|
| 2010/0271676 A1 | 10/2010 | Renaud-Goud |
| 2014/0293385 A1* | 10/2014 | Smithwick ............... G03H 1/26 359/9 |
| 2015/0116798 A1 | 4/2015 | Smithwick |
| 2017/0140689 A1* | 5/2017 | Kobori ..................... G09G 3/02 |
| 2018/0275402 A1* | 9/2018 | Popovich ........... G02B 27/0103 |

* cited by examiner

SCANNED COARSE INTEGRAL HOLOGRAPHIC DISPLAY HAVING HOLOGRAPHIC LENSLETS DISPLAYED BY SPATIAL LIGHT MODULATOR

BACKGROUND

1. Field of the Description

The present invention relates, in general, to autostereoscopic displays and to holography and to holographic displays, and, more particularly, to displays adapted to facilitate scaling and tiling (or otherwise combining) such holographic displays, e.g., scalable and tileable coarse integral holographic displays such as scanned coarse integral holographic displays.

2. Relevant Background

Holography is a technique that enables three-dimensional (3D) images to be generated, recorded, and later displayed. It typically involves the use of a laser, interference, diffraction, light intensity recording, and suitable illumination of the recording. The image changes as the position and orientation of the viewing system changes in exactly the same way as if the object were still present, thereby making the image appear in 3D. The holographic recording itself is not an image as it is made up of an apparently random structure of varying intensity, density, or profile.

As the demand for 3D displays rapidly grows, holographic displays are considered by many within the 3D entertainment industry as the ultimate goal of 3D displays. Such high regard is held for these devices because holographic displays are capable of displaying all the 3D cues of a real scene to a viewer. Unfortunately, to date, designing and fabricating holographic displays have proven difficult due to one or more challenges that have limited display size, field of view, and frame rate and/or have prevented providing both horizontal and vertical parallax.

In this regard, to create a large holographic display with a wide field of view (fov), the pitch of the display's spatial light modulator (SLM) must be fine (e.g., less than 1 micrometer ($\mu m$) and more typically less than 0.5 $\mu m$ for an approximately 30° fov) over a large area (e.g., 127 millimeters (mm) by 100 mm or the like). Unfortunately, the pitches of common SLMs, such as digital mirror devices (DMDs) or liquid crystal on silicon (LCOS) devices, are typically only as coarse as about 5 to 10 $\mu m$ and are the same horizontally and vertically, providing only 1° to 3° fov. Further, the pitches are only maintained over small areas in these devices such as over 20 mm by 20 mm. Demagnifying optics can be used to increase the pitch and field of view but at the generally unacceptable expense of the image size (and vice versa) due to the Lagrange Invariant (i.e., for an optical system of only lenses, the product of the image size and ray angle is constant).

In some attempts to provide an improved holographic display, multiple SLMs have been tiled together to increase either the size or field of view of the hologram. With simple spatial tiling of multiple SLMs to increase the size of the hologram, however, there are noticeable seams in the holographic image due to gaps between the SLMs from the borders and electronics. Spatial tiling of a single SLM has also been achieved using replication optics or using 2-axis scanners. Gaps and misalignments in the spatial tiling appear at the hologram plane and visually interfere with and confuse the 3D imagery. Multiple SLMs have also been arranged in an arc, with precision optical mounts, to increase the field of view. The holographic images overlap in the center of the arc a far distance from the SLMs, with a corresponding reduction in the holographic image's resolution the further the distance from the SLM. Several of these systems use an asymmetric diffusing screen, producing horizontal parallax only (HPO) images. Accousto-optical modulators (AOMs) are capable of providing traveling acoustic waves of pitches of about 5 $\mu m$ over larger lengths. These large lengths can be arranged into widths of about 1 meter by heights of about 100 mm. However, to cancel the motion of the traveling waves, descanning optics and scanners are required. Also, other optics may be required to create higher pitches at the expense of display width. Further, the acoustic waves only diffract in one direction, and the resulting hologram is necessarily HPO.

Due to the horizontal arrangement of the human eyes, horizontal parallax is more important than vertical parallax for binocular stereopsis and motion parallax. This fact is often used in horizontal parallax only (HPO) holographic displays to reduce computation and data bandwidth requirements compared to full parallax holographic displays. However, the appearance of the HPO hologram does not change with vertical motion of the viewer and their viewing location or point of view. In other words, a single viewer may move their head up and down or vertically (e.g., be sitting or squatting and then stand up), and the hologram's appearance would not change as would a true 3D object. In some artistic and entertainment applications, especially those provided for single stationary viewers, the loss of vertical parallax may be acceptable.

However, vertical parallax is important to fix absolute position in space. In many 3D display implementations, the loss of vertical parallax is not acceptable, which has led some experts in the 3D display industry to argue that a holographic display that is HPO is a "non-starter." For example, in implementations involving interaction with the hologram or involving multiple viewers that collaborate (e.g., point to or interact with the same location on the holographic image), the holographic display will be ineffective unless there is at least a small amount of vertical parallax. Such "limited vertical parallax" may be necessary for the viewers to see or experience a consistent scene from differing points of view. Due to human kinetics (e.g., it is easier for humans to shift their views left and right than up and down), the amount of desirable vertical parallax is often much lower than a desirable amount of horizontal parallax.

Hence, there is a need for holographic displays or holographic display systems that address some of these challenges. Preferably, such new holographic displays would provide a relatively large 3D image or hologram and would provide some amount of vertical parallax (e.g., provide limited vertical parallax). An issue, though, facing such development is that providing different amounts of information and fields of view in the horizontal and vertical directions is difficult with current full parallax holographic displays. With common square pixel SLMs, the horizontal and vertical pitches and, therefore, the fields of view are the same (unless anamorphic optics are used, which often is not desirable due to astigmatic aberrations, cost, manufacturing and design complexity, and other concerns).

SUMMARY

In previous work and research, the inventor recognized that it is desirable to implement holographic displays or display systems that are each adapted to combine holographic displays and coarse integral displays to produce or display a coarse integral hologram. However, it is also then desirable to provide a display system or assembly that is useful for combining such displays or display systems to add more detail or information. For example, it is desirable to provide a display system that can be assembled as if it were made up of "holographic bricks" that can be stacked and combined to provide a unique image/output. Briefly, the display system described herein teaches techniques for combining coarse integral holographic (CIH) displays in a seamless and scalable manner (e.g., a display system where multiple spatial light modulators (SLMs) can be placed or provided behind coarse integral optics).

The displays and systems may be thought of as using a method of combining several low pitch, small area spatial light modulators (SLMs) and/or spatially/temporally multiplexing a single SLM to form a modestly sized, wide horizontal field of view display with a small amount of vertical parallax (e.g., providing limited vertical parallax rather than providing an HPO display). The horizontal and vertical information content and fields of view may be adjusted separately.

The SLMs provide a set of fully holographic 3D images, but each with a small area and a small field of view (or "fov"). Each hologram output by the SLMs reproduces a different narrow viewpoint of the same 3D scene. The coarse integral optics angularly tiles the multiple narrow field of view holograms into a single large field of view hologram. For example, a holographic display system can be built that includes an array of holographic display devices each operable to provide a plurality of holographic images of a scene from differing viewpoints of the scene. In some embodiments, the holographic display devices are each a spatial light modulator operable to display one of the plurality of holographic images.

These embodiments of holographic display systems used coarse integral optics to angularly tile an array of multiple small size, small field-of-view (fov) holograms into a single larger and wide fov holographic image. One specific embodiment used a two-axis galvanometric mirror and appropriate optics to scan sequential holograms produced by a single high speed SLM (e.g., a Texas Instrument digital micromirror device (DMD)) into a desired array. A typical SLM is small and its pixel pitch is coarse so that it can produce a small area, small fov hologram, but the inventors recognized that it has a large bandwidth and high frame rate (e.g., up to 22,000 fps) to produce many such holograms during the time period of a normal video frame (e.g., $\frac{1}{24}^{th}$ to $\frac{1}{60}^{th}$ of a second).

The inventors recognized that there are limitations on how much information can go through a scanner, which can become a bottleneck for optimizing a holographic display system as the SLM (e.g., a DMD) is often not being maximized. The limitations include scan angle, mirror size, and scan speed, and, in brief, the inventors improve upon the above-described embodiments to provide new coarse integral holographic displays (or new full-color, full-parallax, full-frame rate holographic displays). These new displays use scan patterns, collaborating optics, color sequencing, and other implementation details to reduce costs and to optimize the displays' use of the SLM's bandwidth.

With these challenges in mind, a scanning coarse integral holographic (CIH) display is provided that includes a scanning relay. This relay may include a spatial light modulator (such as a DMD) displaying elemental holograms of a 3D scene and also include an array of field lenslets and a scanner assembly operable to direct each of the elemental holograms onto one of the field lenslets. The CIH display may further include a coarse integral optics assembly positioned between the scanning relay and a viewing space for the holographic display. The coarse integral optics assembly is adapted to combine the elemental holograms into a single hologram viewable in a hologram image plane, and the scanner assembly may include a resonant scanner, which may be operated to provide vertical dither.

In some embodiments of this modified CIH display, the scanner assembly further includes an X-Y scanner receiving output light of the resonant scanner and scanning the elemental holograms onto the field lenslets, and the scanner assembly may further include at least one relay lens disposed between the resonant scanner and the X-Y scanner. The X-Y scanner may be implemented with two or more ganged scanning devices operating in unison to provide the scanning of the elemental holograms. The scanner assembly can be operated to direct the elemental holograms onto the field lenslets following a boustrophedon scanning pattern. In these and other cases, the elemental holograms comprise a set of red, green, and blue holograms for each view of the single holograms and wherein the spatial light modulator is illuminated with a light source providing view sequential color synchronized with the display of the red, green, and blue holograms on the spatial light modulator.

In another embodiment, a scanning coarse integral holographic display is provided that does not necessarily utilize ganged scanners (and only optionally a resonant scanner). In this CIH display, there is a scanning relay comprising a spatial light modulator and a controller operating the spatial light modulator to display sub-holograms of a 3D scene and to concurrently display an array of holographic lenslets with one of the lenslets paired with each of the sub-holograms (e.g., in place of physical lenslets). The CIH display also includes a coarse integral optics assembly comprising a pair of transform lenses positioned between the scanning relay and a viewing space for the holographic display. The scanning relay further includes a scanner assembly operable to direct each of the sub-holograms and a paired one of the holographic lenslets onto a plane between a pair of transform lenses. During operations of the CIH display, the coarse integral optics assembly combines with the pair of the transform lenses the plurality of sub-holograms into a single hologram viewable in a hologram image plane in the viewing space.

DETAILED DESCRIPTION

Figure 1:
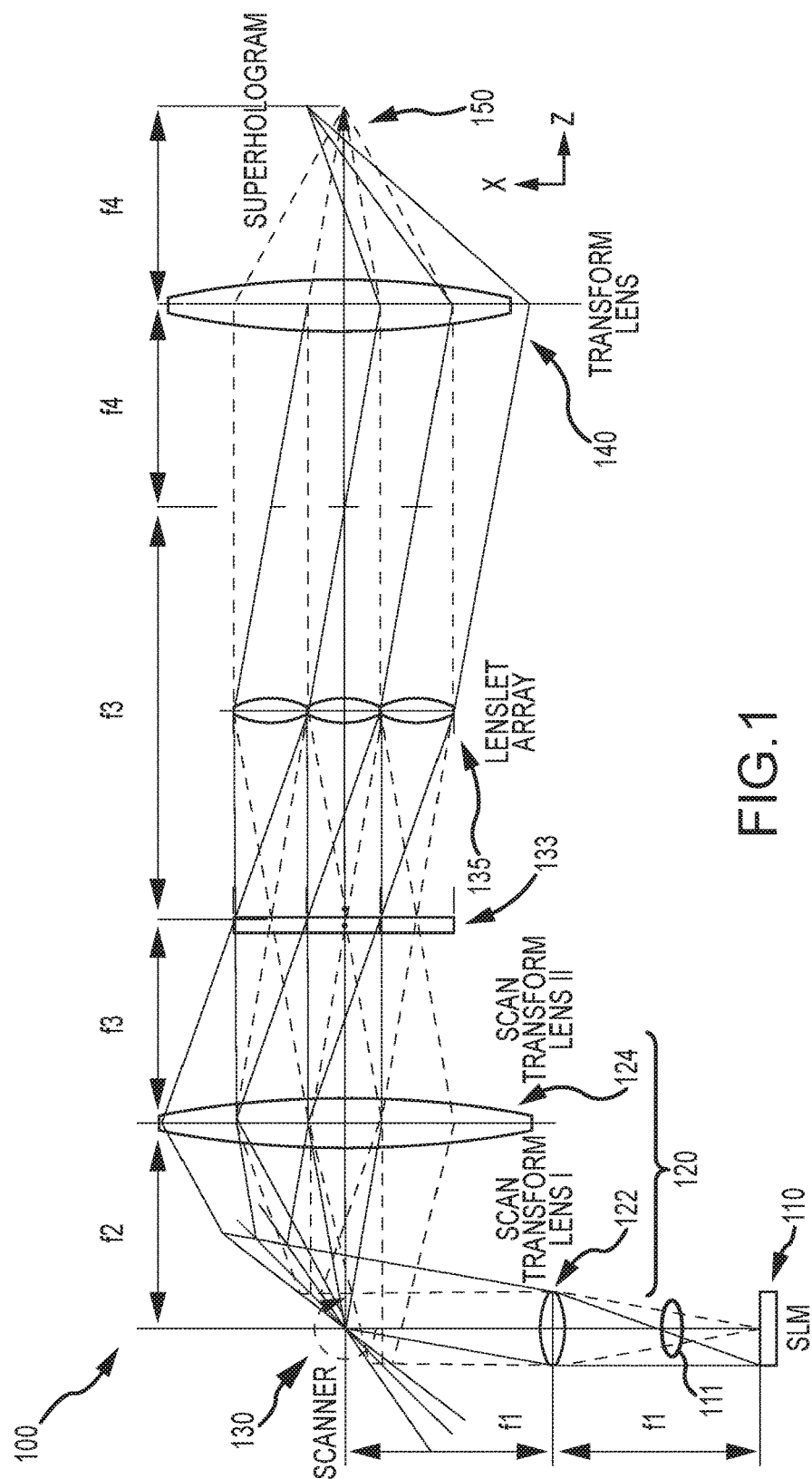
FIG. 1 illustrates a coarse integral display that uses a single image source and scanning to provide an angularly tiled super hologram.

Briefly, the present description provides a display system that scans holographic diffraction patterns displayed on a spatial light modulator (SLM) and a lenslet into an array of such images behind a common transform lens to create angularly tiled color holographic imagery. Generally, each of the CIH displays includes a plurality of spatial light modulators (SLMs). The SLMs are arranged in a side-by-side (or planar) manner and may be low pitch, small area SLMs, and the CIH display systems are configured with coarse integral optics (or an optical assembly) to combine the output images or output light (i.e., small area and small field of view (fov) holograms) from the SLMs to form a modestly sized, displayed holographic image (a single larger area hologram with a large fov) with possibly different horizontal and vertical fields of view.

A coarse integral display may include an array of SLMs providing "elemental" 2D images, a lens array, and a large transform lens. Each elemental image in the array of 2D images is of the same scene but from different viewpoints. A lens array is placed in front of the SLMs to receive the array of 2D images, such as with one lens centered over each viewpoint image output from the SLM array. Each image-lens pair becomes or acts, in effect, as a narrow field of view projector, with such projectors' axes all being parallel in a typical implementation.

The large transform lens is selected to act or function to reimage the projectors' images and to bend the projectors' axes so that they cross and fan outward. The 2D images are thereby angularly tiled by the optics or coarse integral optical assembly. This produces a view-dependent image with a wide field of view. However, the views are discrete and discontinuous, and each image is still 2D. An apparent 3D image may be seen, but the coarse integral display does not support accommodation cues for a reasonable number of views.

With this in mind, the SLMs of the array can be operated to provide an array of elemental holographic displays rather than elemental 2D images in the coarse integral display. In this way, each element in the output coarse integral hologram is a narrow field of view 3D hologram that includes all 3D cues including stereopsis, accommodation (focus), and vergence cues. Also, and significantly, the output or produced 3D hologram has continuous horizontal and vertical parallax. The course integral optics are designed to (and do act to) tile the viewpoints of many narrow field of view elemental holographic displays (e.g., SLMs) into a single, large field of view or "super" holographic display. It should also be understood that because the array of elemental 3D holograms provided by the array of SLMs does not need to form a square array, the field of view in the horizontal direction may be different from that of the vertical direction.

With this general understanding of a CIH display understood, it may be useful to discuss exemplary challenges addressed with the display systems of the present description. As will be understood by those skilled in the arts, a holographic display is unlike a projection or large screen display in that it has to maintain a high pixel density (or pitch) even at large display sizes. The hologram's pixel pitch determines how much a light ray is bent (or diffracted). For example, a pixel pitch of about 0.001 millimeters (mm) deflects a light ray about 30 degrees. The need for having a dense pixel density over the entire large display area is driven by the hologram's pattern of varying pixel pitch, which can direct and focus light to create a three-dimensional (3D) image with a complete set of 3D cues including parallax, stereopsis, and focus.

Unfortunately, it is difficult to create a single large holographic display due to the enormous amounts of information that must be computed and displayed. A space bandwidth product is a measure of the display's information content related to the pixel pitch maintained over a display area. The space bandwidth product of current SLMs, such as a digital micromirror device (DMD), only allows a display that is, for example, 1-inch by 1-inch with a 0.2 degree by 0.2 degree field of view (fov).

To increase the size of the display from a single SLM, one may try to take advantage of the high speed frame rate of current SLMs (e.g., a DMD may operate at 22,500 frames per second (fps)) and a mirror scanner to distribute multiple images of the SLM. Work has been done to develop a holographic display system that uses a scanned DMD and coarse integral optics (e.g., a lens array and a large transform lens) to create a dynamic hologram. For example, FIG. 1 illustrates a CIH display (or holographic display system) 100 that is operated to provide a super hologram 150 with angularly tiled views (e.g., with crossing optical axes).

The following description teaches one skilled in the art the implementation of a variety of coarse integral holographic displays with reference to FIG. 1. Beginning with FIG. 2 and the associated description, the inventors teach a number of improvements or enhancements that can be utilized to enhance the operation of these display systems such as to provide improved use of the available bandwidth of the SLM to provide an improved super hologram. Prior to moving to the discussion of the displays/display systems of FIG. 1, it may be useful to briefly describe improvements provided in the displays/systems that can be achieved by the concepts taught beginning with FIG. 2.

During the inventors' research into creating a holographic display device (e.g., implementing displays as shown in FIG. 1), the inventors analyzed: (a) the amount of information (and related hologram size and field of view (fov)) contained in a desired holographic pattern; (b) how much information a typical SLM may produce in a single frame as well as over time; and (c) how a scanner and related optics may be used to tile, combine, and increase the information in a hologram of larger information content, size, and fov. Generally, the display system concepts discussed beginning with FIG. 2 were selected and created so as to use as much of an SLM's frame rate as possible to produce the largest number of SLM tiles possible and, thereby, to achieve the largest and widest fov holograms possible (or at least larger and wider fov holograms than previously achieved/achievable with prior display systems).

The display systems may be modified to make use of or include: (1) ganged scanners; (2) a boustrophedon scan pattern; (3) scanned lens and DMD array/holographic attached lenslet; (4) view sequential color; and/or (5) a resonant scanner. First, a set of ganged scanners (two, three, or more) may be used in place of the single scanners shown in each coarse integral holographic display in FIG. 1. To increase the amount of information the scanning system/assembly can handle, ganged scanners may be used to increase the scan angle, mirror area, scan speed/frequency, or a combination of these three scanning parameters/characteristics. With this first modification, a coarse holographic display system may be provided that significantly increases (up to 100 percent increase or doubling of) a single scanner's abilities. A second modification may be used to avoid the need for horizontal and vertical flyback regions in the scan pattern, which would result in wasted and/or unused DMD frames. Particularly, the second modification to a coarse integral display system may be to use boustrophedon scanning. In this way (with this control technique), tiles are produced on both the forward and backward scan directions.

A third modification of the display system may involve use of a scanned lens and SLM (e.g., DMD) array and/or a holographic attached lenslet. For instance, the display system of FIG. 1 may operate so as to scan the image of the SLM into an array behind a matching physical lenslet array (e.g., one lenslet for one SLM image). In research efforts, a custom lenslet array was found to be prohibitively expensive for a prototype on a research budget, and it was believed that there may be alignment challenges between the SLM image and a corresponding lenslet. The inventors realized that because each SLM image is paired with a corresponding lenslet, the images can be scanned together and inherently aligned. Further, it was realized that the lenslet could be a holographic lenslet and be computed/attached in the hologram displayed on or by the SLM. This alternative configuration has a number of benefits, but it will be understood that the resulting optics causes the SLM image to be relayed onto the scanning mirror, which may make it more difficult to gang multiple mirrors to increase the effective width of the scanner without introducing seams (which may make it difficult to wholly utilize a particular SLM's (e.g., a DMD's) information rate).

A fourth modification may involve use of view sequential color. For instance, with the scanner's frame rate, the mirror (scanner) may not be able to slew fast enough so that sequential frames do not overlap. With the coarse integral optics, overlapping frames in the array can result in overlapping views in the final angularly tiled image and smeared images. However, the inventors determined that different colors can be overlapped, which allows a single mirror scanner to be used and overlapping frames while still adding additional color detail and information to the holographic images.

A fifth modification may include the replacement of a conventional scanner with a resonant scanner. To increase the amount of information the scanning system/assembly can handle, the scan angle, the mirror area, the scan speed/frequency, or a combination of these three parameters may be increased. Modifications, for example, to the scanning assembly may be able to double the scanner's abilities, but it is likely that even further increases in the scanning assembly's capabilities can be achieved using a resonant scanner. Particularly, a resonant scanner can be used with a scan frequency comparable with the non-resonant scanner but with a larger scan mirror or scan angle. This scanner would replace the non-resonant scanner in any one of the display system of FIG. 1.

Alternatively, a resonant scanner may be chosen and used that has a much larger frequency/scan speed. This scanner would work in conjunction with the horizontal and vertical scanners in some display system embodiments (modifications of the system of FIG. 1), providing a low amplitude but high frequency vertical dither scan. Multiple vertical tiles are produced for each horizontal tile. This would increase the number of vertical tiles and, hence, the vertical fov. The non-resonant vertical scanner produces a low frequency (frame rate) scan with a large scan angle, which further tiles the horizontal and vertical dither tiles.

As shown in FIG. 1, a CIH display 100 may include an SLM 110 and an optical relay (e.g., a 4 f relay) 120 with first and second lenses 122 and 124, respectively. The CIH display 100 includes a scanner 130 disposed between the first and second lenses 122, 124 such as at the optical relay's Fourier plane. The SLM 110 may be located at the front focal plane of the first lens 122, and the scanner 130 may be located at the rear focal plane of the first lens 122 and at the front focal plane of the second lens 124. The scanned and translated SLM image 133 may be located at the rear focal plane of the second lens 124. During operation, the SLM 110 rapidly displays elemental holograms 111 that are synchronized to the 2D scanner 130 (and also to the SLM image location). The scanner 130 is adapted and controlled to spatially tile multiple SLM images 111 behind a lenslet array 135 and large transform lens 140, which act to angularly tile the rapid sequence of elemental holograms 111 generated by the SLM 110 into a super hologram 150.

The system 100 may be operated to create a dynamic hologram 150 that is, for example, a few inches on a side (e.g., 3 inches by 2.25 inches in one working prototype) with a +/−8 degrees by +/−1 degree field of view and a frame rate of about 25 fps. Note, for a modestly sized display with only a few simultaneous viewers, horizontal parallax and field of view (e.g., +/−8 degrees) are generally more important for obtaining an acceptable viewing experience (displayed 3D image) than vertical parallax and field of view (+/−1 degree) since a viewer's eyes and the viewers themselves are typically distributed horizontally relative to the display system 100.

Note, the above display system is described for use in providing super holograms. However, it will be understood that other images may be provided by the SLMs or other image sources provided behind coarse integral optics. For example, a two-dimensional (2D) multi-view version of a display system may be provided. In this version, elemental 2D images (display devices such as SLMs) are used to give a multi-view image instead of holograms, and the display system may be adapted to provide scanning of 2D images to get 3D images as output from the coarse integral optics, with the scaling and tiling problems handled as described herein.

The SLMs used in the described display systems may take the form of digital mirror devices (DMDs), liquid crystal on silicon (LCOS) devices, optically addressed SLMs (OASLMs), electrically addressed SLMs (EASLMs), or the like. These may each be operated to output an elemental hologram, and these are combined by a coarse integral optical assembly. In some cases, the spacing of the elemental images should be equal to the lenslet width or height to ensure the tiled view zones abut without gaps or overlap. The size of the super hologram may be stated as $D=f_2/f_1 \, d$, where $f_2$ is the focal length of the large transform lens. The field of view in one direction of the super hologram is $\Phi_{x,y}=n_{x,y} \cdot f_1/f_2 \cdot \theta$, where $n_x$ or $n_y$ is the number of elemental images in that direction. The number of elemental images (i.e., number of SLMs in the array) can be selected to be different in the horizontal and vertical directions (i.e., $n_x$ does not have to equal $n_y$), which can be used to provide different fields of view for a hologram. The resulting hologram may be further demagnified to decrease its image size and increase its field of view (or vice versa) in particular implementations of the system.

A coarse integral holographic display can be used to generate holographic images or super holograms that exhibit full parallax with different fields of view in the horizontal and vertical directions. The super hologram also exhibits accommodation, occlusion, and view-dependent shading. The holographic image may appear to the viewer to be a real image floating in front of or behind the display (e.g., in front of the final field lens).

Based on the inventor's design, it is believed that course integral holographic displays can be built or manufactured to effectively use coarse integral optics. These optics or optical assemblies will allow output images from multiple SLMs to be combined efficiently, which will increase the holographic display's space-bandwidth product (e.g., information capacity). The space-bandwidth product can be flexibly assigned such as more to the horizontal field of view than the vertical field of view. Furthermore, the field of view can be asymmetric, which can be useful in displays that may be normally or often viewed off axis, such as table displays.

Although many SLMs have coarse pitches over small areas, many SLMs are capable of high bandwidth and frame rates, e.g., DMDs are capable of several thousand binary frames per second. Only 15 to 60 frames per second are needed for apparent continuous motion. The additional bandwidth/frames per second can be used to sequentially create multiple elemental holograms with a single SLM, which can then be spatially tiled behind the lens array using 2D scanners and then angularly tiled using the coarse integral optics. The SLM temporally multiplexes the elemental holograms, the 2D scanner spatially multiplexes the elemental holograms, and the coarse integral optics angularly multiplexes the elemental holograms.

The scanning system may include an SLM, a 4f optical relay, and a scanner located at the optical relay's Fourier plane. The SLM is located at the front focal plane of the first lens. The scanner is located at the rear focal plane of the first lens and also the front focal plane of the second lens (scanning on the Fourier plane). The scanned and translated SLM image is located at the rear focal plane of the second lens. The SLM rapidly displays elemental holograms (computed to display holographic images from the appropriate viewpoints) that are synchronized to the 2D scanner and SLM image location. To tile the SLM images without motion blur caused by scanning, the SLM illumination can be flashed when the scanner and SLM images are at the tile locations. The scanner spatially tiles multiple SLM images behind the lenslet array. As with other configurations, a large transform lens is provided for angularly tiling the rapid sequence of elemental holograms generated by the single SLM into a super hologram.

The display systems taught herein may be thought of as providing angular tiling with their coarse integral optics. Such angular tiling has advantages over spatial tiling of SLMs. With spatial tiling, there are noticeable seams in the generated or output holographic image due to gaps between the SLMs from the borders and electronics. Gaps and misalignments in the spatial tiling appear at the hologram plane and visually interfere with and confuse the 3D imagery.

In contrast, with angular tiling as provided by the displays of the present description, the seams appear as gaps in the angular views. Small missing view zones are visually less obtrusive and can further be blended using a light diffuser (not shown in FIG. 1 but readily understood by those skilled in the art). Angular misalignments result in disjointed motion parallax. The angular tiling also lends itself to view-dependent holographic rendering algorithms, such as holographic stereogram and diffraction specific parallax panoramagrams. Further, view-dependent holographic algorithms naturally handle view-dependent lighting and shading, occlusion, and accommodation cues in the holographic images.

With the above description in mind, it may be useful to explain some of these concepts again and/or in more detail to clarify how one may implement a holographic display by combining multiple spatial light modulators to achieve a larger holographic output or 3D displayed image while providing at least some amount of vertical parallax. The proposed solution or display system combines holographic displays with coarse integral displays. The holographic displays (e.g., an array of SLMs) provide a set or array of fully 3D images (e.g., elemental holograms) but with a small area and a low fov. Each of these small holograms is a different (narrow) viewpoint of the same 3D scene. The coarse integral display (or coarse integral optical assembly or optics) combines the multiple narrow field of view holograms into a single large (in size and fov) hologram or "super hologram."

As discussed at the beginning of this description, the display system and components shown in FIG. 1 provide a number of useful ways to implement coarse integral holographic displays such as through the use of scanning, and the inventors during their research in prototyping such systems discovered and designed a number of useful modifications that significantly improve the ability of the display systems to effectively utilize the bandwidth of the holographic display devices (e.g., SLMs such as DMDs). The following description with reference to the figures beginning with FIG. 2 includes at least the following five modifications or improved embodiments of display systems: (1) ganged scanners in place of a single scanner; (2) a boustrophedon scan pattern; (3) scanned lens and SLM (or DMD) array/ holographic attached lenslet; (4) view sequential color; and/or (5) a resonant scanner. Each of these modifications/ new embodiments is described in detail, but the description first provides further details on implementing a display system for holography, on methods for providing coarse integral holograms, and information content with regard to coarse integral holographic displays.

Holography uses diffraction from encoded fringe patterns to reconstruct the light wavefront of a real or synthetic scene. It can contain all the information required to reproduce every visual cue for three-dimensional (3D) images. To create a dynamic holographic display, the holographic fringe patterns are presented on a spatial light modulator (SLM), and an updatable wavefront of a 3D image is reconstructed with suitable illumination. However, a large detailed hologram with a wide field of view requires a vast amount of information both optically and computationally, which makes holographic video challenging to realize.

To create a large hologram with a wide field-of-view (fov), the spatial period of the fringes should be relatively small (e.g., <1 μm fringe period for ~30° diffraction angle) and maintained over a large area (e.g., 127 mm×100 mm). The division of the hologram's spatial extent by the finest fringe period (inversely proportional to the fov) is a dimensionless number called the space bandwidth product (SBP):

$$SBP = \frac{4 \times w \times h}{d_w \times d_h} \qquad \text{Eq. (1)}$$

where w is the width of the hologram, h is the height of the hologram, $d_w$ is the fringe period in the horizontal (width) direction, and $d_h$ is the fringe period in the vertical (height) direction.

The SBP is equal to the maximum number of addressable points (points that could potentially be resolved or created) in an imaged plane. The SBP also relates to the maximum number of addressable voxels by the hologram and, hence, the information content of the hologram. For an analogue hologram with a SBP of $N^2$, the number of addressable voxels is $N^3/3$. As a result, the potential voxel resolution of the reconstructed 3D volume is of interest. The SBP is related to the etendue ($A\Omega$) or optical extent of the reconstructed light controllable by the hologram. For a hologram of projected area A, emitting into a solid angle of $\Omega$ with a rectangular field of view, the optical extent is equal to:

$$A\Omega = w \times h \times \cos \Phi \times (\phi_2 - \phi_1) \times (\cos \theta_2 - \cos \theta_1) \qquad \text{Eq. (2a)}$$

where w and h are hologram width and height, respectively; $\phi_2$ and $\phi_1$ are horizontal diffraction range boundaries; $\theta_2$ and $\theta_1$ are vertical diffraction range boundaries; and $\Phi = (\phi_2 + \phi_1)/2$ is the central angle of the diffraction range relative to the hologram's surface normal.

For a solid angle of a rectangular field of view with a small vertical field of view, this can be approximated as:

$$A\Omega = w \times h \times \cos \Phi \times \Delta\phi \times \Delta\theta \qquad \text{Eq. (2b)}$$

where $\Delta\phi$ is the horizontal (azimuthal) diffraction range bound by $[\phi_1, \phi_2]$ and $\Delta\theta$ is the vertical (polar) diffraction range bound by $[\theta_1, \theta_2]$ for the solid angle $\Omega$ described in spherical coordinates.

The hologram's horizontal and vertical diffraction ranges are governed by the diffraction equation:

$$\theta = \sin^{-1}\left(\frac{m \cdot \lambda}{d} + \sin\theta_i\right) \qquad \text{Eq. (3)}$$

where $\theta$ is the diffraction angle of the diffraction order m, $\lambda$ is the illumination wavelength, d is the fringe period, and $\theta_i$ is the illumination angle of the reconstruction beam. The hologram's optical extent is, therefore, also defined by the hologram's area and fringe period and is related to its SBP.

Unfortunately, common SLMs used to present synthetic holograms have limited SBPs, which are equivalent to the total number of addressable SLM pixels. Commodity SLMs, such as digital micro-mirror devices (DMDs) or liquid crystal on silicon (LCOS) devices, are typically pixelated with pixel pitches only as coarse as 5-10 µm and are the same horizontally and vertically. Furthermore, the pixel patches are only typically maintained over a ~20 mm×20 mm device. Since at least two pixels are needed per fringe period, the coarse pixel pitch and small area results in small field of view and a low SBP. Optics can increase the fov but only at the expense of the image size, and vice versa, due to the optical invariant. The optics do not change the optical extent nor the SBP of the system. Additionally, the pixelated SLMs often have quantized modulation levels and care should be taken to ensure they have the ability to present all the information contained in the desired hologram.

Over the years, various methods have been proposed to overcome this challenge of using SLMs with limited SBPs in holographic displays. Recently, there has been remarkable progress towards the realization of such apparatus. The two main approaches are to spatially tile multiple SLMs or SLM images or to create new modulators with larger SBPs. For example, the QinetiQ holographic display spatially tiled multiple images of an electrically addressed SLM (EASLM) onto an optically addressed SLM (OASLM) using a shuttered lens array acting as replication optics. In another example, A*STARS's system combined more than twenty commodity SLMs to increase the total SBP to deliver large 10" wide color holographic video with a limited viewing angle. A*STARS concurrently uses more than twenty graphic cards to compute the holographic content. In another example, the National Institute of Information and Communications Technology (NICT) created holograms on a custom developed 8k4k multi-level phase-only SLM, which represents the largest SBP for a single digital SLM to date. As a further example of recent progress, there are also horizontal parallax only (HPO) holographic displays. A Tokyo University of Agriculture and Technology (TUAT) display used a DMD, a scanner, and a pulsed laser to spatially tile overlapping holographic images. The Mark series holovideo systems from the Massachusetts Institute of Technology (MIT) used custom acousto-optic modulators (AOM) to create long streams of fine pitched traveling fringes that are de-scanned, tiled, and de-magnified.

While HPO holograms require significantly lower computation and bandwidth to display than full parallax holograms, they exhibit inherent astigmatism limiting reconstruction depth. Also, the appearance of a HPO hologram does not change with vertical motion of the viewer's viewpoint. In applications involving interaction with the hologram or multiple collaborative viewers, even a small amount of vertical parallax is necessary for the viewers to perceive a consistent realistic scene. However, even in current full parallax holographic displays, providing different information content and different fields-of-view in the horizontal and vertical directions is difficult. With common square pixel SLMs, the horizontal and vertical pixel pitches, and, therefore, fields-of-view, are the same. In many cases, especially with limited resources, it would be desirable to have more information and wider fields of view in the horizontal direction.

For comparison, several existing full parallax holographic video systems may be selected and their data shown in Table 1. Table 1 also includes a prototype designed and fabricated by the inventors and labeled "Dynamic CIH" and which will be introduced with more detail in later portions of this description. In Table 1, "SLM bandwidth" is the maximum total number of pixel bits per second provided by the combination of SLMs (pixels per pattern×pattern rate) and "effective bandwidth" is the equivalent number of pixel bits per second necessary to provide the achieved display performance (bits per pixel×pixels per pattern×pattern rate× number of colors).

TABLE 1

Comparison of existing holographic video displays (with the QinetiQ and A*Star being less preferred except for their bandwidth, with the NICT being more preferred and especially for its SBP of device pattern, and Dynamic being even more preferred except for its SBP of device pattern)

| System | SLM | SBP of device pattern ($\times 10^6$ bits) | Number of Devices | SLM Bandwidth per device ($\times 10^9$ bits/sec) | Effective Bandwidth ($\times 10^9$ bits/sec) | Hologram Tiling Structure | Algorithm |
|---|---|---|---|---|---|---|---|
| QinetiQ (2004) | FELCOS | ~1.0 | 4 | ~0.8 | ~3 | Spatial | Point-based |
| A*STAR (2013) | FELCOS | ~1.3 | 24 | ~0.924 | ~22.4 | Spatial | Point-based |
| NICT (2014) | LCOS | ~33.2 | 3 | ~2.0 | ~6 | Spatial | Point-based |
| Dynamic CIH (2015) | DMD | ~0.8 | 1 | ~17.8 | ~10 | Angular | Layer-based |

Because the optical extent and effective bandwidth in a HPO system are not comparable with those of a full parallax holographic display system, this description focuses on full parallax holographic displays. However, even with the remarkable progress of these displays towards large holographic video, there are still steps and improvements that should be made to try to achieve an ideal holographic display. Embodiments of the inventors' proposed scanning coarse integral holographic display (or display system) uses opto-mechanical scanning and coarse integral optics to optically angularly tile an array of holograms created by a single modulator (e.g., one that is low SBP but high bandwidth (SBP×pattern rate)). The resulting (or produced or generated or displayed) full-parallax holograms have a larger SBP produced at useful video frame rates.

As discussed with reference to FIG. 1, methods of angularly tiling several low SBP holograms can be used to form a modest size, full parallax hologram with a wide horizontal fov and some vertical parallax. The information can be flexibly distributed and adjusted separately between horizontal and vertical fov. This solution is produced by combining holograms and coarse integral optics into a coarse integral hologram display (CIHD). The low SBP holograms provide a set of fully 3D images, but each has a small area and a small fov. Each hologram reproduces a different narrow viewpoint of the same 3D scene. The coarse integral optics angularly tiles the multiple narrow fov holograms into a single large fov hologram. The CIHD used, in some cases, a static array of holograms recorded as a binary mask. To create a dynamic hologram by tiling SLMs may be expensive and may underutilize the bandwidth of each SLM.

With these challenges with angularly tiling in mind, the inventors propose one solution that involves angularly combining several low SBP holograms from a single scanned high-pattern rate SLM into a modest size wide fov, full parallax hologram at video frame rates. Full three-component color is also incorporated using view sequential color in the inventive coarse integral hologram display systems, and these systems may be designed to take advantage of the SLM's high bandwidth. The inventors, as discussed below, also implemented a multi-view, multi-layer hologram rendering algorithm on the holographic video system to achieve the rapid hologram generation. To make the display system more understandable, the information content is discussed in a holographic display. The description also explains how the information contained in a desired analogue hologram is affected and reproduced when presented on a pixelated binary SLM with limited information (but high bandwidth capabilities) and combined using opto-mechanical and optical systems. The description further teaches how the rendering algorithm works with the hardware to remove unused or redundant information to reduce the computational load.

At this point, it may be useful to discuss further information content and the holographic display (or display system) beginning with information content and optical extent. Particularly, to address the motivation behind the optical system/assembly of the display systems clearly, the optical extent, imaged volume resolution, and information content of a desired hologram and of a common SLM are calculated. For example, an SLM of 1,024×768 resolution with a pixel pitch size of 10 µm would have a 10.24 mm×7.68 mm area. A hologram presented on the SLM, with at least two pixels per finest fringe period, would have a diffraction range of 1.81°×1.81° about the center of the field of view for a 633 nm laser light source based on the diffraction equation (Eq. (3)). From the total number of SLM pixels, its SBP is equal to $0.78 \times 10^6$, and, from Eq. (2b), its optical extent is 257.65 mm$^2$·deg$^2$.

Optical demagnification may increase the field of view but only at the expense of the hologram size. The SBP and the optical extent remain constant. In order to have a larger hologram size (e.g., 50 mm×40 mm) and wider diffraction ranges (e.g., 10°×5°), it would be required to provide an optical extent of approximately $10^5$ mm$^2$·deg$^2$, which is approximately 388 times that of a single SLM pattern. Such a large hologram would require integrating 388 of the previous holograms each with a pixel resolution of 1,024×768 together, regardless of their pixel pitch and/or optical demagnification.

With regard to SLM and information capability, there are many SLM candidates able to provide the holographic fringe patterns, such as LCOS, ferroelectric LCOS (FELCOS), and DMDs. These SLMs are all pixelated with similar SBPs, as their sizes (extents) and pixel pitches are typically optimized for similar uses in the display and projection industries. Essentially, the device's SBP is related to its total number of pixels, and its potential information content is related to the product of its SBP and number of bits per pixel. However, these SLMs differ in the type of modulation, number of modulation levels, and bandwidth (specifically, bits per second). LCOS and FELCOS are phase modulation devices. An LCOS device can support multi-level phase modulation but at a low pattern rate (e.g., less than 100 Hz). An FELCOS device only supports binary phase modulation but is capable of kHz pattern rates. A DMD is a binary amplitude modulator working in a reflection mode and can operate at up to 32 kHz pattern rates. Currently, a DMD can be driven faster than an FELCOS device because the DMD's driving electronics are more developed for the available commercial market.

The different levels of modulation are often used to control the amplitude of the holographic fringes and, thereby, the intensity of image voxels. Therefore, these different SLMs may also have different information capabilities (information bits per pattern) and bandwidths (bits per second) even with the same SBP. However, it is also known that binary quantized holograms (e.g., two amplitude or phase modulation levels such as clear and opaque, 0 and $\pi$ radians of phase) are capable of producing grayscale 2D imagery or 3D holographic images, though the resulting grayscale image may be noisy due to the inexact conversion of a complex-valued (amplitude and phase) hologram to an either amplitude-only or phase-only fringe pattern presented on the SLM. A common technique to ameliorate the noise is to add random phase perturbations over several patterns so as to change the noise distribution for each pattern, which is averaged over time. Discrete binary holograms are of interest because many of the high-pattern rates SLMs operating in the kHz pattern rates, such as FELCOS devices and DMDs, only provide binary modulation.

Although a hologram presented on a binary SLM has the potential of addressing all the voxels defined by the hologram's extent and fringe period, this type of SLM's information capability is often much less than that of the hologram of similar spatial extent and fringe period but presented on an SLM with multi-level modulation control of each pixel. Specifically, the voxels may be addressable based on the pixel pitch and extent of the SLM, but they are not all accessible at the same time due to the binary modulation and limited information capabilities of the SLM. For example, a binary SLM (e.g., a DMD) with a 1,024×768 XGA resolution only has information capability of (1,024×768×1) bits per pattern while LCOS XGA may be used as an SLM to provide (1,024×768×8) bits per pattern.

To present grayscale holographic images using a binary device, one should consider the additional information required to modulate the voxels intensities. Although the binary hologram presented on the binary DMD may produce a grayscale holographic 3D image, it is at the expense of the number of voxels the DMD can simultaneously access. For example, if it was desired to have 256 gray levels (8-bits) in a holographic 3D image, the number of 3D points should be reduced simultaneously accessible by the binary hologram by a factor of eight. Only one eighth of the voxels may be on at a time due to the conservation of information. It should also be noted that this redistribution of information is only applicable from the number of bits to the number of image gray levels (no matter whether the SLM pixel is binary or with gray levels). Information cannot be transferred from the number of hologram pixel gray levels into addressable levels into addressable voxel resolution nor the optical extent (field of view or spatial extent) since these are determined only by the fringe period and area of the hologram.

However, the DMD has a high bandwidth as one of its main advantages. For example, a high definition DMD can be driven at a 23 kHz pattern rate, with a bandwidth of $47.99 \times 10^9$ bits per second. Comparatively, a high definition LCOS device can be driven at about a 100 Hz pattern rate and, therefore, has a bandwidth of about $1.66 \times 10^9$ bits per second, which is less than 4 percent of the high definition DMD. Therefore, a CIH display system may be configured so as to effectively make use of the high bandwidth of the low SBP, high bandwidth DMD as the SLM to temporally multiplex multiple holograms. Each of these holograms (or elemental holograms as labeled above with reference to FIG. 1) presents a subset of the desired points in the grayscale (or color) holographic image. The high bandwidth DMD may be used while still achieving an overall holographic image update period of less than $\frac{1}{20}$ second. Hence, the inventors determined that it was useful and achievable to encode holographic fringe patterns as pixelated binary holograms and then display or present them on a low SBP, high bandwidth binary SLM (such as a DMD) to produce grayscale or color 3D holographic images with the CIH displays and display systems (made up of two or more CID displays) taught herein.

With regard to implementing a CIH display (and display system with one, two, or more CIH displays or CIH assemblies), it is useful to provide an optical configuration that is useful for providing angular tiling. To fully take advantage of an SLM with a high bandwidth but low SBP, it is desirable to provide a device to temporally multiplex and distribute information as necessary over one update period. As discussed with reference to FIG. 1, instead of using spatial tiling, the display systems are configured to use angular tiling using coarse integral holography. Angular tiling enlarges the effective viewing angle by tiling many sub-holograms (or elemental holograms) angularly.

To implement angular tiling, a hologram is displayed on an SLM. Then, a 4f optical relay with a 2-axis scanning system at the Fourier plane is used to create a spatial array of SLM/hologram images behind a corresponding lenslet array. The lenslet array and a single common transform lens can be used to form a coarse integral optical assembly, which relays and angularly tiles the sub-holograms. The lenses (or lenslets) and scanning mirror (or scanner) are selected so as to be able to accept the optical extent of the light diffracted by the hologram and the SLM. In practice, a rectangular array of elemental holograms supports different horizontal and vertical viewing angles. It also allows for more efficient use of information because the required horizontal viewing angle is usually wider than the vertical viewing angle.

Figure 2:
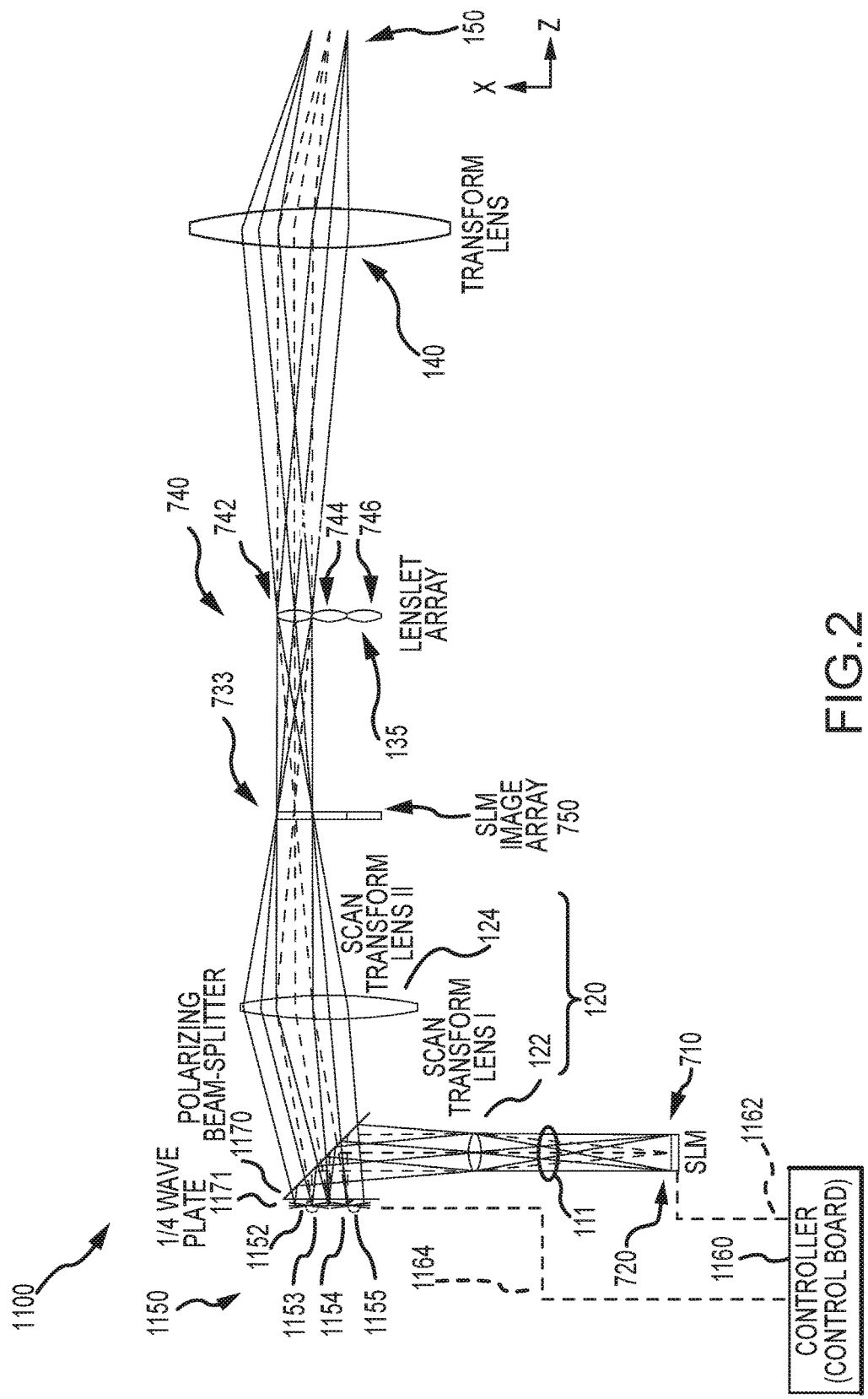
FIG. 2 illustrates a scanning relay that may be used in a display system and is shown to include a scanning assembly providing two or more ganged scanners.

As discussed above, the inventors identified at least five modifications or improvements to the concepts discussed above with reference to the display systems of FIG. 1. A first improvement mentioned above is the use of ganged scanners. FIG. 2 illustrates a scanning relay 1100 similar to the scanning relay 100 of FIG. 1 but modified to include a scanner assembly 1150 providing two or more ganged scanners in place of the single scanner 130 shown in use in FIG. 1.

As shown, the scanner assembly 1150 includes two or more ganged scanners that are operated in unison via control signals 1164 from a display controller 1160, which also acts to operate via signals 1162 the SLM 710. In the assembly 1150, two scanners 1152, 1154 are shown to be used in place of the single scanner 130 of display 100, and these are rotated (about X and Y axes) as shown with arrows 1153, 1155 in response to control signals 1164 from controller 1160 to move in unison and to have movements synchronized with operation of the SLM 710 as discussed above for a single scanner 130. The ganged scanners 1152, 1154 (which may number from 2 to 4 or more with 2 shown as one useful example) are positioned between the SLM 710/lens 122 and the scan transform lens 124 as was the case for the single scanner 130 to provide an array of SLM images as shown at 750 that are aligned over time with an array behind the transform lens 140. An optional beam-splitter 1170 is placed between the ganged scanners 1152, 1154 and the transform scan lens 122, so the ganged scanners are oriented perpendicular to the optical axis (rather than at 45 degrees). Additionally, the beam-splitter 1170 may be a polarization sensitive beam-splitter, and a quarter waveplate 1171 may be placed between the polarization sensitive beam-splitter 1170 and the ganged scanners 1152, 1154 to improve light efficiency.

Although there are physical gaps between the scanners 1152, 1154, the human eye does not observe these gaps as the scanners are not at a focal plane (i.e., they are at the Fourier plane, with gaps appearing as missing viewpoints which are smoothed over). The scanner assembly 1150 with the ganged scanners 1152, 1154 is utilized to increase the amount of information the scanning relay 1100 can handle. The scanner assembly 1150 can be designed (such as by selecting a size and number of mirror scanners) and/or controlled via controller 1160 so as to increase the scan angle, the mirror area, the scan speed/frequency, or a combination of these three scanning system parameters, ultimately leading to larger and/or more SLM images in the SLM image array 750 and a larger and/or wider field of view superhologram 150. In some cases, the use of the scanner assembly 1150 may be useful for significantly increasing (e.g., 0 to 100 percent (or doubling) or more increase) in the scanning abilities of the relay 1100 (e.g., relative to use of the single scanner 130 in relay 100 of FIG. 1).

In addition to the ganging of scanners, the inventors determined that another design change could be made (e.g., a "third modification" as labeled above) with regard to implementing a scanned SLM and scanned lens (or holographic attached lens) array. It was recognized by the inventors that manufacturing and alignment of a custom lens array (lenslet array) with a large number of lens element may be expensive and difficult. Further, it was understood that each holographic sub-hologram (or elemental hologram) displayed by an SLM (such as a DMD) is paired with a corresponding lenslet in the arrays shown in FIGS. 1 and 2. With this understanding in mind, it was determined by the inventors that the scanner (e.g., a galvanometric scanner or the like) can be used to scan a single SLM and its corresponding lenslet into a SLM/lenslet array behind the final transform lens.

Figure 3A:
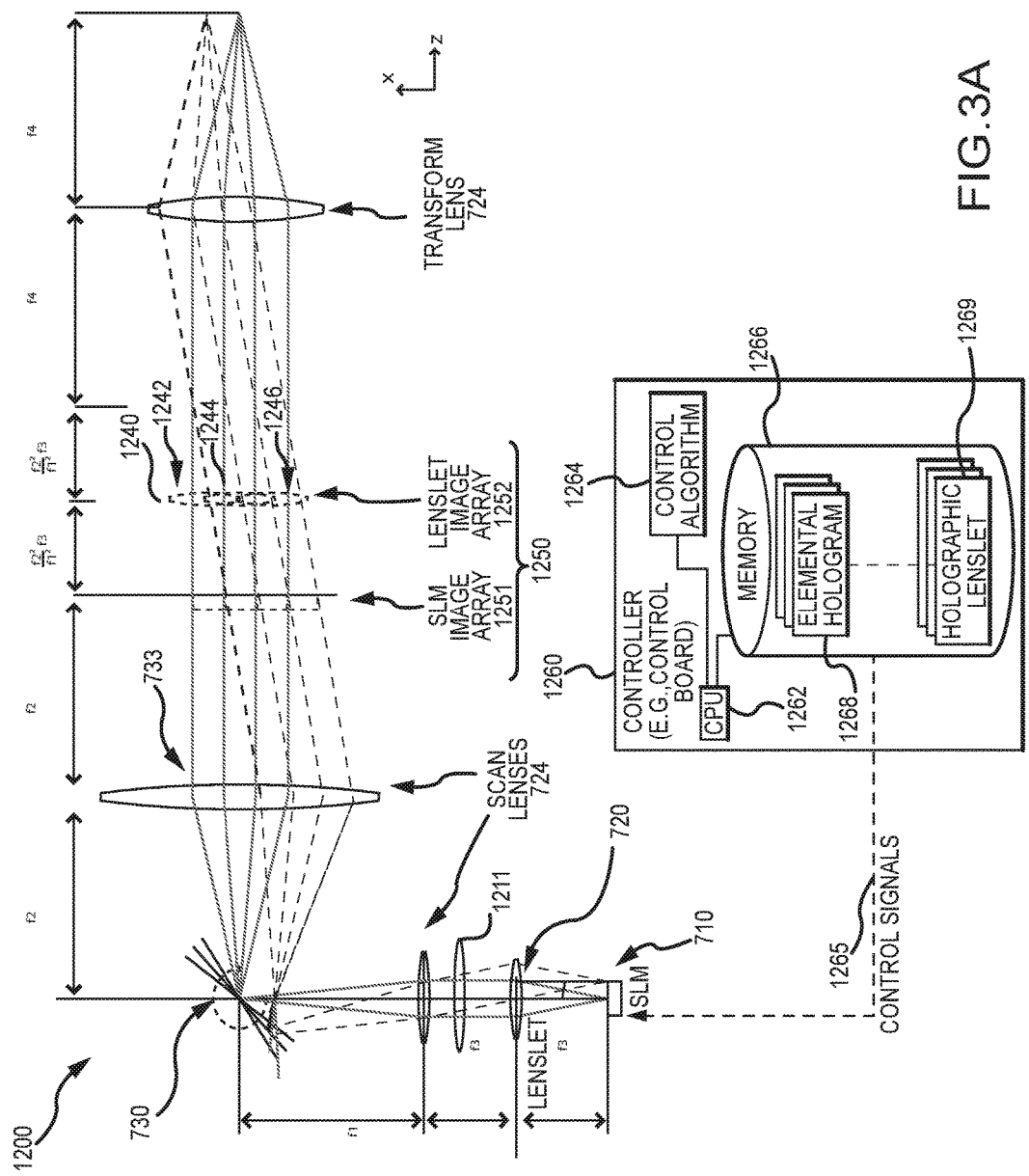
FIG. 3A illustrates a scanning relay that may be used in a display system of the present description and is shown to use a scanned lenslet array via control of the SLM.
Figure 3B:
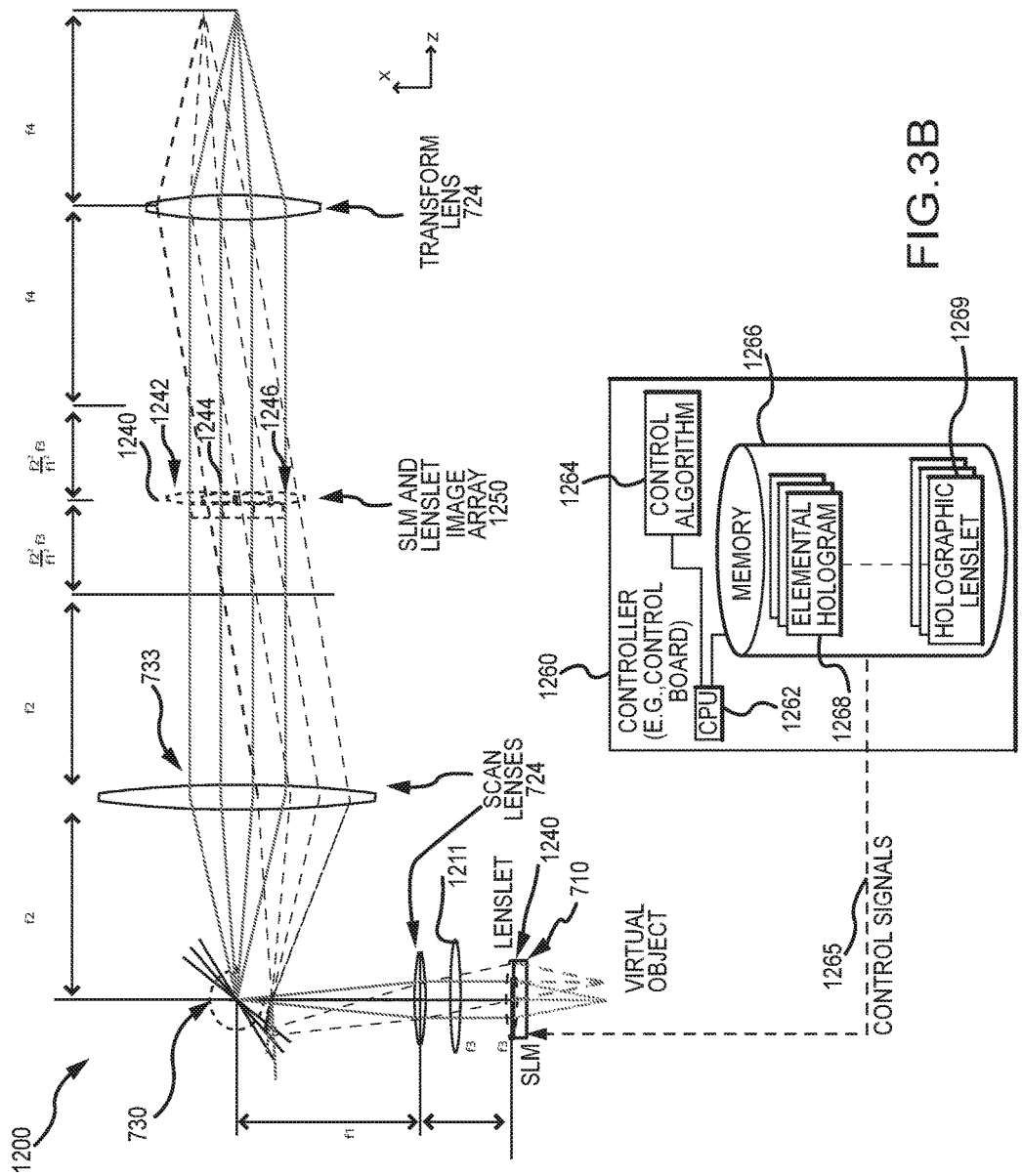
FIG. 3B illustrates, similar to FIG. 3A, a scanning relay that may be used in a display system of the present description and is shown to use a virtual/holographic lenslet array via control of the SLM.

Significantly, the lenslet array may be a physical lenslet or holographic lenslet that is computed and added to the holographic pattern displayed on the SLM. FIG. 3A illustrates a scanning relay 1200 embodiment (which may be used in place of any of the scanner/scanning relays described herein such as those of FIG. 1), and the relay 1200 builds upon the relay 100 of FIG. 1 but without the need for a physical lenslet array 135. The physical lenslet array is replaced with a single physical lenslet 720 in front of the SLM 710, that when scanned, appears as a SLM and lenslet array 1250, with lenslets 1242, 1244, 1246 each displayed/presented by the SLM 710 in its output 1211 and with each physical lenslet 1242, 1244, 1246 being paired with one of the elemental holograms or sub-holograms in the SLM image array 1251. Alternatively, as FIG. 3B illustrates, the physical lenslet is replaced with a holographic lenslet 1240, which is computed and added to the subhologram displayed on the SLM 710, and its output 1211 is then scanned to produce a SLM and a holographic lenslet image array 1250, with lenslets with corresponding elemental holograms or subhologams 1242, 1244, 1246. Although the holographic lenslet 1240 is located at the SLM, rather than being spaced away from it, this only introduces a phase shift, which the human eye is insensitive to.

To this end, a controller 1260 is provided in the scanning relay 1200 that includes a processor 1262 executing code/instructions (or software all which may be stored in a computer readable medium) to provide a control algorithm 1264 that generates control signals 1265 to operate the SLM 120 to display, from memory 1266 (or rendered on an ongoing manner) an elemental hologram 1268 paired with a holographic lenslet 1269 in the holographic pattern/SLM output 1211, which is then scanned by scanner 130 as discussed above (but without a physical lenslet array). The unique relay 1200 is desirable in part because of the simplicity of the system configuration using a scanned combination of SLM with an attached holographic lens to form a sub-hologram and lenslet array 1250. Because it was much easier to manufacture, the inventors believe the relay 1200 may be useful in initial development efforts for a CIH display (or system with two or more CIH displays).

The relay 1200 appears in its design to be equivalent to imaging the holographic image on the scanner 730, having the scanner 730 angularly tile the holographic image, and then relaying and scaling the angularly tiled holographic image as a real image. The use of the attached holographic lens (e.g., lenslet 1269 paired with an elemental hologram 1268 for display in output 1211 of SLM) and design based on the CIH concepts are important to the configuration of relay 1200 and should be considered one useful embodiment or modification to prior work in coarse integral holography. One disadvantage of this configuration over the general scanned CIH system with physical lenslet arrays is that the holographic image appears on the scan mirror preventing the ganging of multiple scan mirrors to increase the size of the scan plane without introducing seams into the holographic image.

Figure 4:
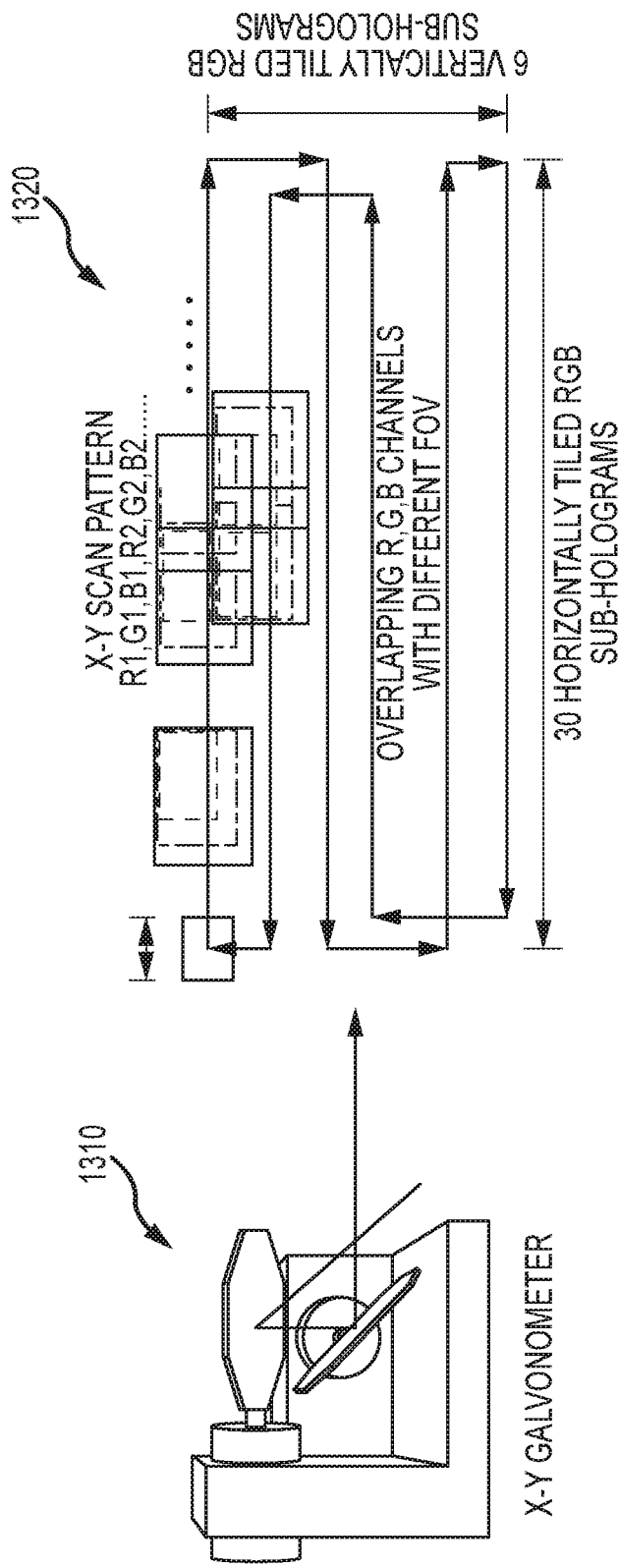
FIG. 4 illustrates a scanner that may be used to implement the scanning relays of the present description along with an X-Y scan pattern that may be used to control its operations.
Figure 5:
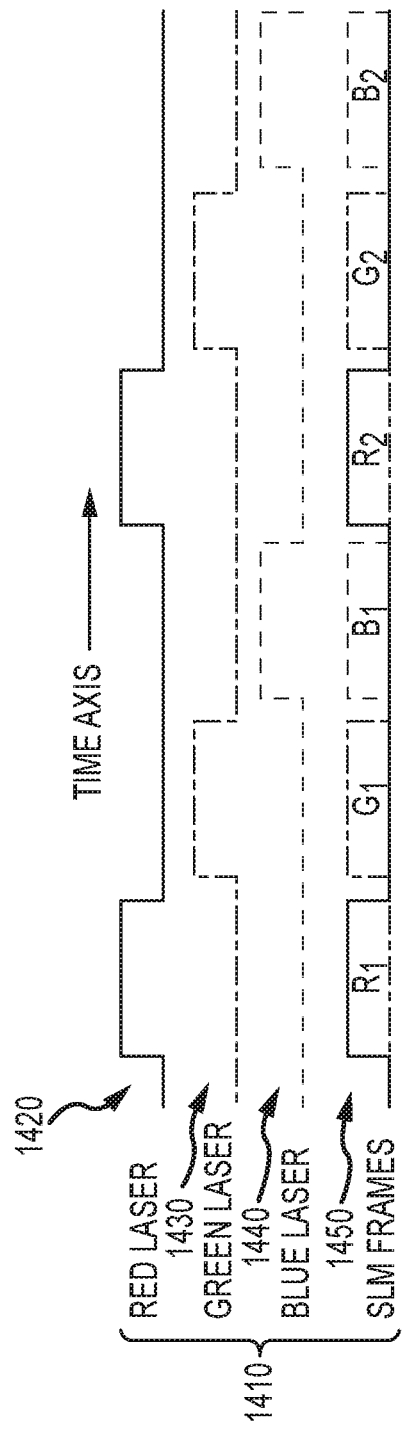
FIG. 5 illustrates graphically operation of a light source (e.g., an assembly of colored lasers) and an SLM to provide or implement view sequential color in a CIH display of the present description (such as in a relay using the scanner and X-Y scan pattern of FIG. 4)

The CIH displays and display systems may also be modified or designed to implement modifications regarding use of a particular scanning pattern and/or use of color scanning (e.g., the second and fourth modifications/improvements discussed above in this description). FIG. 4 illustrates a scanner 1310 (e.g., an X-Y galvanometer) that may be used (or controlled by a controller as shown in FIGS. 2 and 3) to implement the scanning relays of the present description along with an X-Y scan pattern 1320 that may be used to control its operations. FIG. 5 illustrates with graph 1410 operation of a light source (e.g., an assembly of colored lasers that may be selectively operated by a display controller) and an SLM to provide or implement view sequential color in a CIH display of the present description (such as in a relay using the scanner and X-Y scan pattern of FIG. 4).

Particularly, the illustration of the X-Y scan pattern 1320 is useful for showing that a controller may operate the scanner 1310 to provide bi-directional boustrophedon scanning with overlapping color sub-hologram (or elemental hologram) fields. The fields of view of each (RGB) channel are different, and the fov of the blue field (in this example) is set to be the overall effective size (e.g., the blue constraint). In the illustration provided in FIG. 4, the squares' shapes and sizes are used to represent the fields of view. In FIG. 5, the lines 1420, 1430, and 1440 are used to show the timing of providing red, green, and blue light, respectfully, by timed operation of red, green, and blue lasers in a light source (or lighting assembly) for an SLM while line 1450 is used to show operation of the SLM by a controller to sequentially display red, green, and blue frames. The RGB laser pulses shown by lines 1420, 1430, 1440 are applied sequentially over an operating time period of a scanning relay and are synchronized in time with the SLM frame pattern (e.g., red laser pulses when red frame of a sub-hologram is displayed by the SLM and so on).

It was recognized by the inventors that to maximize the use of a scanner's capabilities and make the scanning pattern efficient that scanning should be performed or controlled to provide one or both of bi-directional boustrophedonic scanning and view-sequential color. Such control methods for scanning are detailed in FIGS. 4 and 5, and the use of these two scanning techniques in a CIH display (or scanning relay for a CIH display) minimizes the overlapping scanning regions and avoids horizontal and vertical flyback regions.

To implement the scanning of FIGS. 4 and 5, each color holographic frame (each sub-hologram or each elemental hologram) is divided into a set of red, green, and blue frames. Then, the scanning method includes controlling the scanner 1310 to temporally multiplex the color components view sequentially while scanning (as shown in FIGS. 4 and 5). The laser signals for RGB components 1420, 1430, 1440 are synchronized with the SLM pattern 1450, which are displayed in RGB order. As they are scanned, color component sub-holograms overlap the previous component ⅓ width of a blue frame. The rendering algorithm (which may be provided as part of a control algorithm/program such as control algorithm/program 1264 of controller 1260 in the scanning relay 1200 of FIG. 3) may be configured in some embodiments to take this shift (equivalent to a change in view direction between color components) and scan direction into account.

However, from Eq. (3), it can be seen that the diffraction angle is proportional to the illumination wavelength. Therefore, the blue component's holographic fringes produce holographic images with the same size but a smaller viewing angle than other color components' fringes. The blue 3D image's field of view is about two-thirds that of the red's field of view. It typically is desirable for all the color components to have the same visible field of view, and, with this in mind, the scanning shown by FIGS. 4 and 5 may include truncating the red and green images' fields of view to that of the blue image's field of view such as by blanking the corresponding portions of their sub-holograms.

Figure 6:
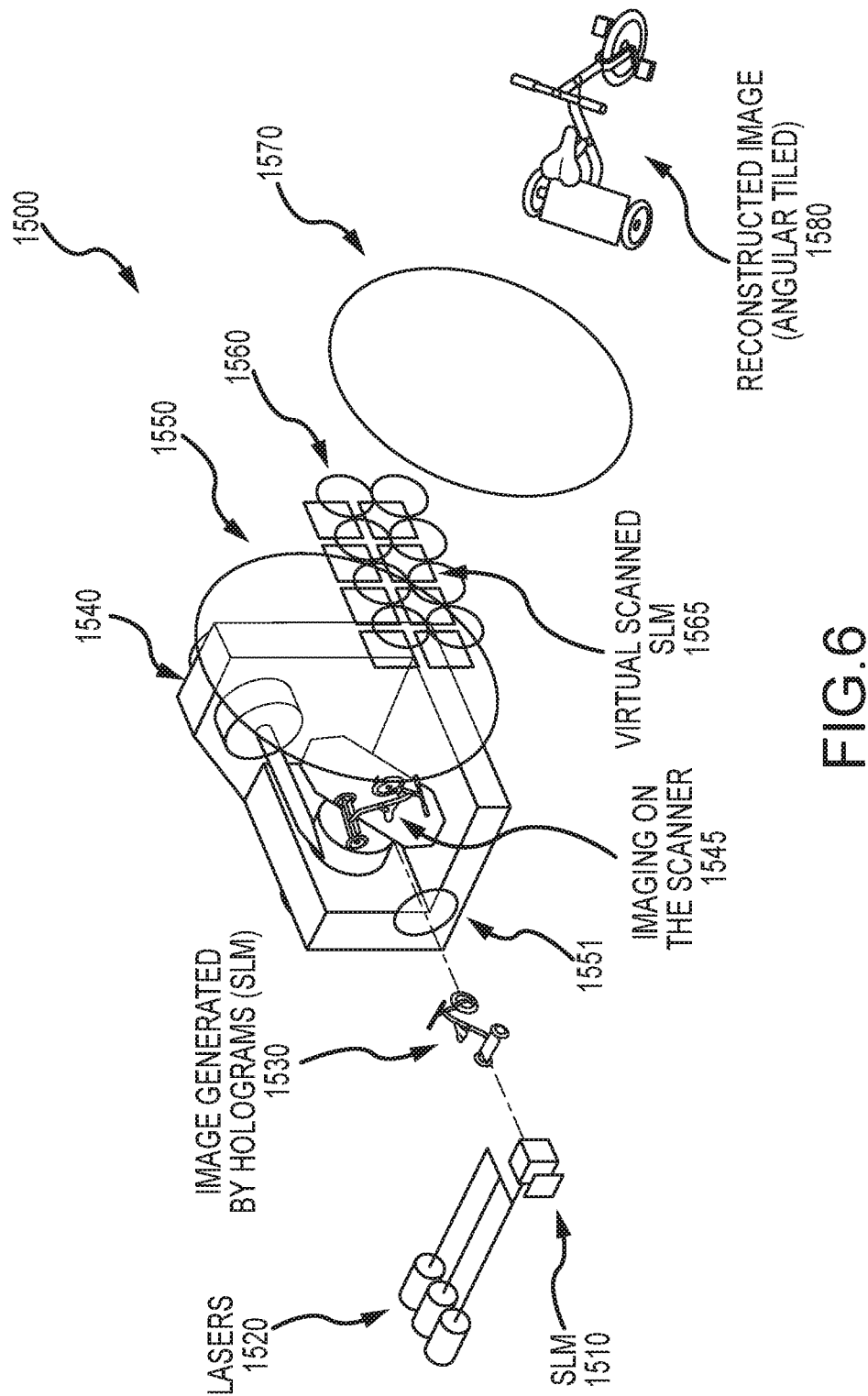
FIG. 6 illustrates one useful embodiment of a CIH display (or display system) that may be used to implement the scanning techniques shown in FIGS. 4 and 5.

FIG. 6 illustrates one useful embodiment of a CIH display (or display system) 1500 that may be used to implement the scanning techniques discussed above with reference to FIGS. 4 and 5. Particularly, the CIH display 1500 includes an SLM 1510 (e.g., a DMD or the like) that is sequentially illuminated with color via the light source 1520 (e.g., red, green, and blue lasers) while it is operated to display color frames of a sub-hologram/elemental hologram, which produces an image 1530. The CIH display 1500 further includes a scanner 1540 and as shown at 1545 the output 1530 of the SLM 1510 provides imaging on the scanner 1540. The CIH display 1500 further includes a pair of transform lenses 1550 and 1570, and a lenslet array 1560 (which may be a physical array or a holographic/virtual array as discussed above with reference to FIG. 3) disposed between the two transform lenses 1550 and 1570. During operations of the CIH display 1500, the virtual scanned SLM images 1565 are presented between the lenses 1550, 1560, and the output of the outer/second transform lens 1570 is a reconstructed image (angularly tiled) or super hologram 1580.

The constructed CIH display 1500 includes, in some embodiments, a high pattern rate, low SBP (e.g., small area and coarse pixel pitch) SLM 1510, transform optics including lens 1550 (and, typically, a scan transform lens 1551 between the SLM 1510 and the scanner 1540 as discussed with reference to FIG. 1 such as lens 122 used with second transform lens 124), a 2-axis galvanometer 1540 to tile the SLM/lenslet images 1560 and 1565 (or a physical lenslet array may be used), and a large common transform lens 1570 (e.g., a large field lens) to perform the angular tiling.

In one particular built and tested prototype of CIH display 1500, sub-holograms with attached holographic lenslets 1530 and 1560 were displayed on a 1,024×768 binary DMD (e.g., Discovery Kit by Texas Instrument) 1510 with a 14.0 mm×10.5 mm area, 13.68 µm pixel pitch, and 22,727 Hz maximum pattern rate. The DMD 1510 was illuminated by red (632 nm), green (532 nm), and blue (450 nm) laser diodes (e.g., from Laser Components of the UK or the like) of laser-based light source 1520 in a view sequential manner. The illumination's angle of incidence was $\theta_i=12°$ with respect to the DMD's surface normal. For this illumination condition and the angle of DMD micromirror's on-state tilt, the $4^{th}$ diffraction order had the greatest diffraction efficiency and its field of view was also centered about the DMD's surface normal, $\Phi=0°$. For these reasons, the $4^{th}$ diffraction order was used for viewing in the CIH display system 1500, and its diffraction range was 2.67°.

The transform optics 1551 were selected to image the holographic image 1530 as shown at 1545 on the galvanometer's mirror. To better balance filling as much of the mirror aperture with as much of the projected SLM area as possible, the SLM pattern was magnified in the prototype system 1500 to 24.7 mm×24.7 mm, with a corresponding decrease in the viewing angle to plus/minus 0.53°×plus/minus 0.40° for 450 nm light. The diagonal of this square area is slightly longer than the aperture diameter. The scanner 1540 was implemented using a 2-axis scanner (e.g., a Nutfield scanner), with a 30 mm round mirror aperture supporting first axis scanning at 70 Hz for a plus/minus 12° optical scanning angle. The scanning speed for this scanner 1540 was equal to 3,360° per second.

With regard to hardware for a CIH display, it was determined that 96 percent of the DMD's pixels were being used to display the holographic fringes while 83 percent of the mirror's area is used for scanning due to the square DMD projection on a round mirror aperture. The plus/minus 12° optical scanning angle can tile 30 sub-holograms per row (plus/minus 0.4° each) horizontally. With the sub-holograms scanned into six vertical rows, the gain was six vertical sub-holograms (plus/minus 0.53° each). The array of sub-holograms and lenslets was angularly tiled with a two-times magnification imaging lens pair. With the entire 22 kHz pattern rate of SLM (e.g., a DMD) in use, the final angularly tile hologram was a 49.4 mm×49.4 mm aperture with a maximum central viewing angle of plus/minus 6° horizontal×plus/minus 1.6° vertical.

To summarize this hardware discussion, the specification of the proposed/prototyped holographic video system included the following: (a) an image size of 49.4 mm×49.4 mm; (b) a central viewing angle of plus/minus 6° by plus/minus 1.6°; (c) a number of tiled sub-holograms of 180 (i.e., 30×6); (d) a frame rate of 23.33 fps; (e) colors (wavelength) including red (632 nm), green (532 nm), and blue (450 nm); (f) an SLM bandwidth of (Max.) $17.8\times10^9$ bits/sec; (g) an optical extent of 23,430 $mm^2 \cdot deg^2$; (h) an SBP of $141.6\times10^6$; and (i) a DMD bandwidth efficiency of 53.2 percent.

Now, with regard to SLM bandwidth efficiency, for each holographic frame, a set of 30 horizontal by 6 vertical sub-holograms were scanned in each of three colors. An entire XGA DMD may be used as the SLM, and the pixel count of each holographic frame would then be $141.6 \times 10^6$ pixels. To provide a 23.33 Hz hologram frame rate, the horizontal scan frequency would be 70 Hz and the DMD's pattern rate would be equal to 12,600 patterns per second or approximately 10 billion pixels per second ($9.91 \times 10^9$ pps). The DMD's maximum pattern rate in the prototype was 22,727 Hz so that only 55.4 percent of the DMD's maximum bandwidth was being used. However, since only 96 percent of the DMD's pixels were used to display the holographic fringes, the actual DMD's maximum bandwidth was 53.2 percent.

The SBP of the hologram of the prototype was $141.6 \times 10^6$ and had an optical extent of 23,430 mm$^2$deg$^2$ (at 23.33 Hz). For comparison, a hologram on a single XGA resolution DMD pattern with a 10 μm pixel pitch (and assuming a blue-constrained system) has a SBP of $0.78 \times 10^6$ and an optical extent of 43.4 mm$^2$deg$^2$ (at 22,727 Hz). Although the prototyped single angularly tiled holographic frame may have contained vastly more information that a single DMD pattern, for a dynamic holographic display, only 53.2 percent of the DMD's capabilities were used. The DMD's reduced effective efficiency is due to the limitations of the scanner's bandwidth. For this particular scanner model's design, the inventors filled a majority of the scanner mirror's area and used a scan angle useful for the desired number of scan lines such that scanning speed was the main limitation. The scanner had an average rotational velocity of 3360°/sec. It took 238 μs for the mirror to rotate 0.8° of the blue frame's horizontal field of view at the scanner mirror. Using three SLM patterns (RGB) per color hologram frame reduced the required SLM pattern period to 79 μs. This pattern period still did not reach the capability of the DMD SLM of 44 μs/pattern (=22,727 Hz). Additional work may be able to increase the scanner's bandwidth, e.g., a scanner with mirrors of lighter material, such as beryllium, could be used to increase the scanning capabilities by a factor of 1.5 to 2.

In the designed and prototyped system, the inventors used an SLM with a XGA resolution, and each single pattern could project a 3D image in a volume of 49 mm×49 mm×49 mm with a viewing angle of 0.8°×0.66° (based on the diffraction of blue light). The depth of the volume was arbitrary and was chosen mainly to present a cubic volume and to prevent significant vignetting of deep objects within the limited field of view of the low SBP holograms. For this system, at a depth of 49 mm, the voxel resolution was still sufficient to present a contiguous high resolution 3D image. Although the vertical fov was small, the main intent was to provide 3D content with horizontal parallax and a definitive and consistent location in space (not provided by HPO displays). It should also be understood that further improvements in the scanner's bandwidth, SLM bandwidth, and/or scaling or tiling multiple SLMs and scanning systems will increase the hologram's horizontal and/or vertical fov, image size, and/or frame rate.

The rendering algorithm, which functions to compute the holographic fringe pattern, that is chosen for use in the CIH display system (e.g., as part of the control algorithm 1264 in FIG. 3) should be compatible with the display hardware and be able to generate multi-view sub-hologram arrays. Although the holographic fringes displayed on the hardware are typically capable of generating arbitrary wavefronts, diffractive patterns, 2D holographic imagery, or voxel distributions, the rendering algorithm is preferably chosen/designed to produce 3D imagery with all the 3D cues. This should also be compatible with a variety of source content (e.g., 3D models or live capture) and have the potential for real-time rendering. Such a rendering algorithm may use an image-based, multi-view, multi-layer holographic rendering scheme. In the following discussion regarding a rendering algorithm, the information content of a holographic 3D image is stressed and analyzed along with the simplifications that a rendering algorithm may employ to efficiently encode that information into the holographic fringes. The discussion also addresses ways the rendering algorithm works with the hardware's capabilities and limitations.

The potential information content of a hologram is enormous. To produce moderate sized, modest field of view holograms, the CIH display hardware described herein uses coarse integral optics and angular tiling to increase the effective SBP per holographic frame, the controllable optical extent, and the number of addressable voxels of the constructed hologram. Due to the limitations of the SLM (such as computation and data transfer speeds), only a subset of the addressable voxels may be actively imaged per frame. To make better use of the hardware's display capabilities, the rendering algorithm should efficiently create holographic fringe patterns that reproduce only the observable parts of the 3D image and reduce or remove any redundant information.

To understand this challenge better, it may be useful to start by describing 3D images with a simplified model to be displayed on the previously described hardware. One can imagine a spatial grid, which as a resolution of 1,024×768× 1,000 voxels (1,024×768 resolution plane chosen due to the resolution of the DMD used in the inventors' prototype and a 1,000 planes to make the depth resolution similar to the horizontal resolution) over a 49 mm×49 mm×49 mm cubic volume. A spatial distribution of voxels is able to reconstruct a spatial 3D image, just like a volumetric display. Unfortunately, a binary SLM with 1,024×768 pixels may only contain 1,024×768 bits of information (it only has control of 1,024×768 independent variables or pixels) and, therefore, can only simultaneously render a limited number of voxels in the volume for each pattern. Fortunately, the shortage of information per pattern on a binary device is compensated by its rapid pattern rate (i.e., its large bandwidth).

Continuing with the grid example, one can assume the horizontal and vertical fovs are divided into 50 horizontal by 30 vertical viewpoints for each voxel so as to provide smooth parallax and changes in view dependent lighting, shading, and occlusion effects. Overall, the necessary bandwidth with discretized views, regardless of the implementation, would then be approximately $2.35 \times 10^{14}$ bits per second (bps) simply based on the information considerations. The total amount of information to simultaneously address and render every voxel, view, and gray level in this volume for every frame is unmanageable with current technology.

Fortunately, the inventors recognized that simplifications can be made and that redundancies and unseen content can be removed to make the rendering load more manageable. For example, the voxels can be removed from internal, occluded, and back facing volumes and surfaces since they are not seen from a small fov around a given rendered viewpoint. For small fovs around that rendered viewpoint, the object will appear solid and can also provide accommodation cues while requiring at most only 1,024×768 voxels, although with each voxel free to occupy any depth. The 1,024×768 pixel binary SLM is capable of reproducing such a small fov 3D image. The binary device can also achieve gray level voxel projection providing the overall bandwidth is sufficient (and each pattern is displayed fairly quickly). Furthermore, the human visual system's depth resolution with accommodation is relatively low. Therefore, the 3D image's resolution can be degraded in depth down to, for example, 1 centimeter per layer at arm's reach viewing distance (e.g., about 60 centimeters) while still maintaining a realistic contiguous perception of depth. These simplifications may only work for a small fov before they may break down, though. View dependent holographic imagery is difficult to produce and also is computationally expensive when achieved by eliminating portions of the holographic fringe patterns corresponding to undesired diffraction into certain view angles even when multiple graphical processing units (GPUs) are used.

In the CIH display system designs taught herein, the inventors took advantage of the nature of angularly tiled CIH holograms to produce view-dependent holograms. Each voxel projected by a sub-hologram calculated by the layer-based method emits light isotropically within its view zone's small fov. The coarse integral optics provides angularly tiled view zones independent of each other. The independence of the view zones allows each sub-hologram to be computed separately and also independently of other sub-holograms for efficient and parallel computation. This allows the rendering algorithm to render and display occlusion/disocclusion effects, to view dependent shading and lighting, and to prevent layering artifacts with off-axis viewing of layered holograms.

For an arbitrary discretized angularly multiplexed layered view structure, such a hologram's total necessary bandwidth is about $2.35 \times 10^{11}$ bps (running at 25 fps), which is three orders less than the previously mentioned grid model and more manageable than addressing every possible voxel. However, binary 22 kHz XGA SLMs can only handle $1.78 \times 10^{10}$ bps, and the current prototype CIH display system only had a 53.2 percent efficiency in using the SLM's bandwidth. This available bandwidth is still ten times less than that required for accessing all possible voxels in the inventors' optimized hologram such that it was possible to render a color volumetric image with 10 percent of the volume covered. Fortunately, though, voxelized 3D surface models (e.g., polygonal or NURBS models) of most solid objects occupy only a small fraction of the voxels in the volume. Hence, it is believed that any 3D surface model can be displayed using the described prototype, including rendering in conjunction with hidden surface removal and backface culling, from multiple angles with smooth parallax.

Figure 7:
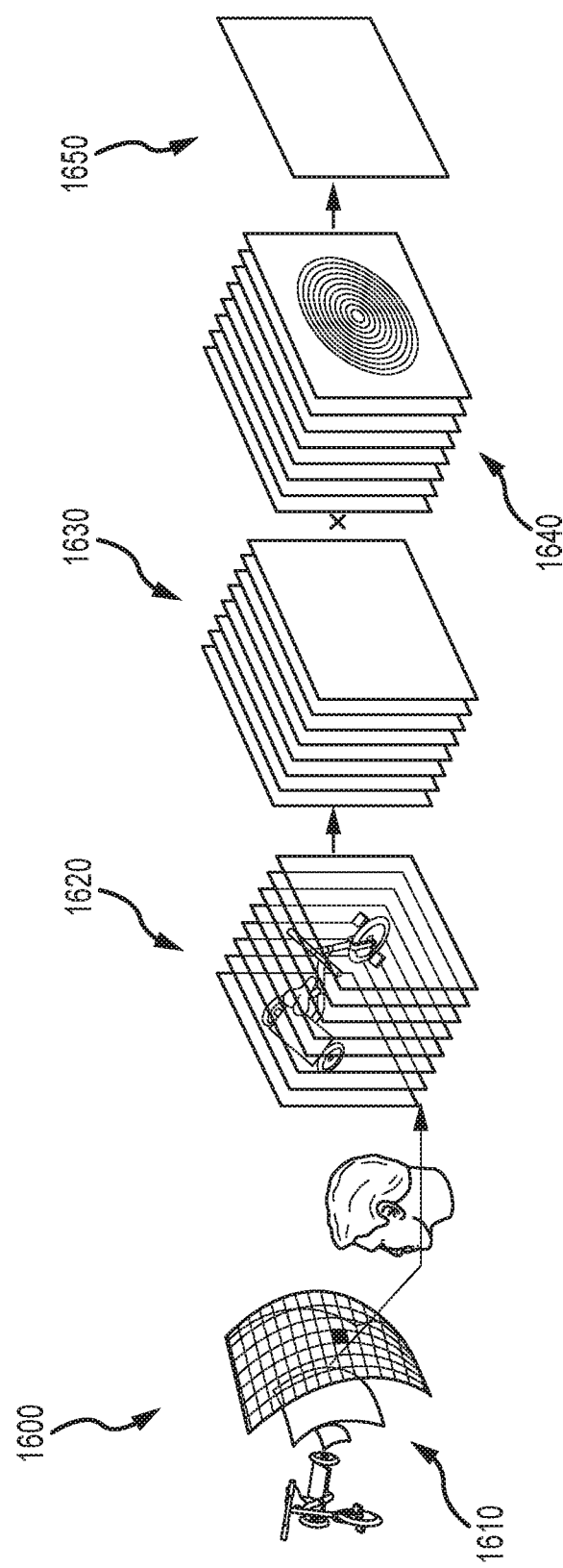
FIG. 7 illustrates steps/functions of a rendering algorithm of the present description.

Based upon this analysis, it can be seen how the image-based, multi-view holographic rendering algorithm removes redundancies, includes important occlusion and view dependent imagery, and efficiently encodes the 3D information into the holographic fringes. Together with known Fourier-Fresnel techniques, rapid calculation speeds can be achieved in a CIH display system. The procedure of the layer-based method 1600 is shown in FIG. 7 as it may be implemented and/or performed by an angularly tiled, layer-based holographic rendering algorithm. In step 1610, the reconstructed holographic image is angularly tiled. In step 1620, each angular view is sliced along its viewing direction reducing the computation load. In step 1630, each layer's hologram is calculated from its image slice's Fourier transformation. In step 1640, corresponding pre-calculated holographic lenses are attached to layers to place each layer at the appropriate depth. In step 1650, the summation of layers becomes the final hologram for this view.

The realization of a rapid hologram rendering algorithm using a standard CG rendering pipeline permits the use of standard 3D models, common animation frameworks, and hardware accelerated rendering to create visually rich holographic content. As a result, a hologram can be rapidly generated with large information content (e.g., greater than $4 \times 10^8$ bits per hologram frame) while producing visually rich 3D imagery with all relevant 3D cues on a single standard graphic processing unit (GPU) in a few seconds as compared to a few hours or days using other algorithms.

Combining a scanning CIH display with the multi-view, multi-layer holographic rendering algorithm allowed the inventors to prove the viability of their ideas including displaying full parallax holographic video. Rendering in a prototype scanning CIH display was performed on a single commodity consumer gaming graphics card (e.g., a NVIDIA GeForce GTX 460SE). The hologram calculations were conducted using GPUmat, an open-source toolbox allowing MATLAB to run the CUDA library on GPUs. Operating the prototype display system in one test run involved capturing a 3D model of objects (e.g., 3D letters) from different viewing angles and then displaying holographic images consisting of these objects. The focus cue was demonstrated using these same objects while another movie clip was produced showing holographic video of an animated object (e.g., an animated toy tricycle). These objects are made up of multi-view layered structures, but the CIH display was able to generate holographic images that appear to the human viewer to be contiguous. The holographic images maintained a consistent location in space regardless of horizontal or vertical viewpoint. Smooth motion full parallax was observed with proper occlusion/disocclusion, without layering or gaps being apparent or appearing with a change in view. Further, testing showed that accommodation and vergence were properly coupled. The prototyped scanning CIH display was able to display 12,600 patterns per second (or 1.15 GB per second).

The holographic rendering algorithm was useful for creating an inline hologram. The central viewing angle of this type of hologram is twice the diffraction range. The holographic image and its conjugation twin are on the same viewing axis but at different depths. In this system, the desired holographic image is angularly tiled, while its conjugation twin image is scanned in space forming a non-coherent pattern in the background.

With the CIH display system concepts of FIGS. 1-7 in mind, it should be clear that to increase the amount of information the scanning system can handle that the CIH display can be configured to increase the scan angle, the mirror size/area, the scan speed/frequency, or a combination of these three scanning parameters. Modifications may be able to double the scanner's abilities or at least significantly increase them. To further increase the capabilities of the CIH display, the scanner assembly or scanning system may utilize a resonant scanner in place of the more conventional X-Y scanners or in addition to the X-Y scanner.

Figure 8:
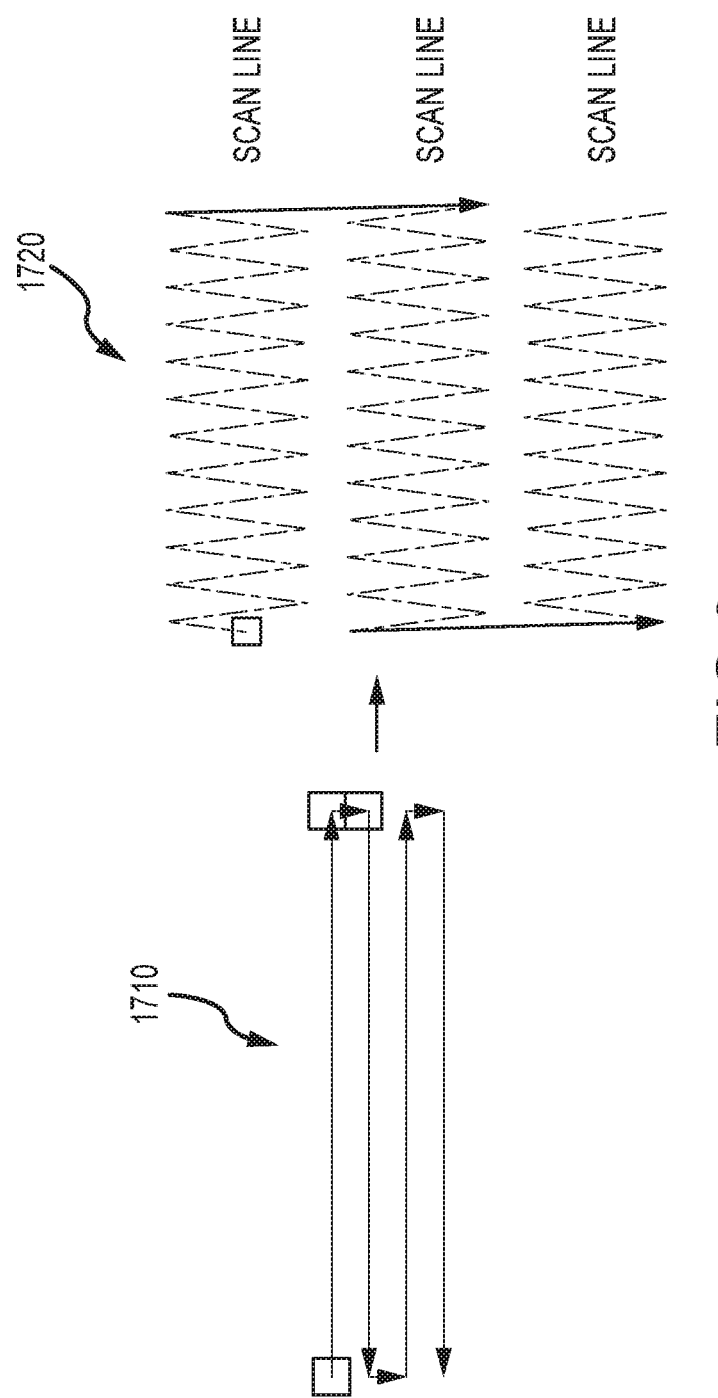
FIG. 8 provides graphs of non-resonant and resonant scanning.

A resonant scanner can produce a highly efficient scan that can be tuned to a specific frequency, which produces a large scan angle with a large area mirror. The inventors recognized that a resonant scanner with scan frequency comparable with the non-resonant scanner but with a large scan mirror or scan angle. This scanner could replace the non-resonant scanner. For example, the scanner 130 of FIG. 1, FIGS. 3A and 3B, and other figures could be implemented using a resonant scanner rather than an X-Y galvanometer or other vertical/horizontal scanner(s). FIG. 8 illustrates with a graph of non-resonant scanning 1710 and with a graph of resonant scanning 1720 the benefits that can be achieved by replacing a typical X-Y scanner with a resonant scanner in the CIH displays taught herein to increase the information provided by the scanner assembly/scanning system.

Alternatively, a resonant scanner with a much larger frequency could be used, and this resonant scanner could be provided in the scanner assembly of a CIH display along with the non-resonant scanner. The resonant scanner would work in conjunction with the horizontal and vertical scanners, providing a low amplitude but high frequency vertical dither scan. Multiple vertical tiles are produced for each horizontal tile. This would increase the number of vertical tiles and, hence, the vertical fov. The non-resonant vertical scanner produces a low frequency (frame rate) scan with a large scan angle, which further tiles the horizontal and vertical dither tiles.

Figure 9:
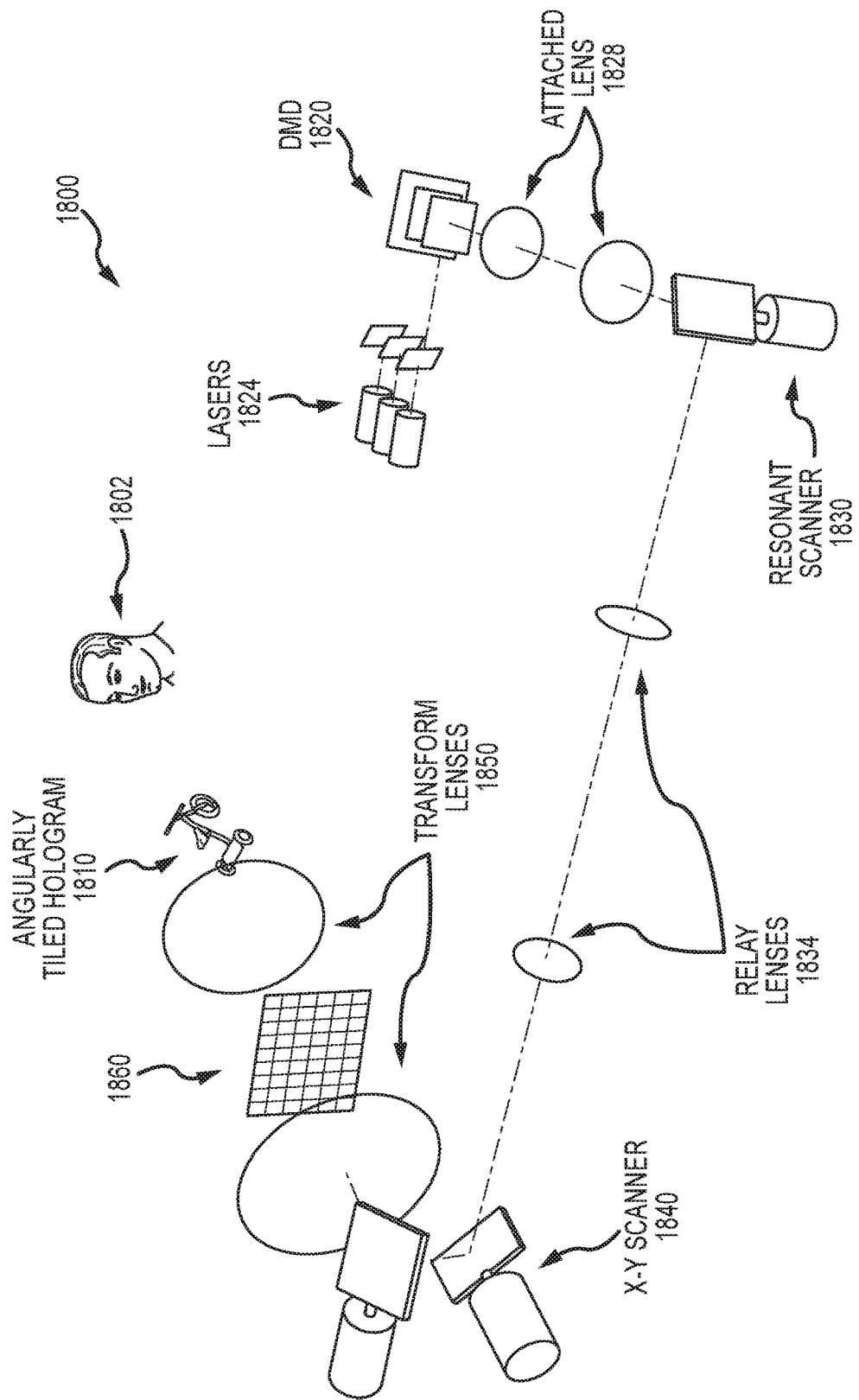
FIG. 9 illustrates a schematic of a CIH display system combining use of a resonant scanner with an X-Y scanner.

Such a CIH display system 1800 is shown in FIG. 9 while it is being operated to generate a super hologram 1810 viewable by a viewer 1802 positioned in a viewing space (downstream of the pair of transform lenses 1850). The system 1800 includes, as with some other systems shown herein, a SLM 1820 that may be a DMD along with a light source 1824 in the form of a set of red, green, and blue lasers to cause elemental holograms displayed on by the SLM 1820 to be output through coarse integral optics 1828 (as shown with relay lenses 1828 and as will be understood from discussion of the systems/techniques of FIGS. 1-7).

A resonant scanner 1830 receives and directs this output toward an X-Y scanner 1840 via a pair of relay lenses 1834, thereby providing a high frequency vertical dither scan to the output of the SLM 1820. The X-Y scanner 1840 provide horizontal and vertical scanning to generate an array of SLM images that are paired with an appropriate holographic lenslet (in other embodiments a physical lenslet array may be used and positioned between transform lenses 1850) as shown at 1860 between the pair of transform lenses 1850, which in turn combines the SLM images 1860 into an angularly-tiled hologram 1810 (as explained in more detail above). The controller of the system 1800 (not shown but understood such as from FIGS. 3A and 3B) would act to synchronize the DMD SLM 1820 to operations of the resonant scanner 1830.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The CIH displays as modified by the teaching herein (e.g., to include ganged scanners, to use boustrophedon scanning, to use view sequential color, and so on) are believed by the inventors to be the first display devices/systems useful for providing full-parallax, video rate, color holographic video. The CIH displays are capable of reproducing all the important 3D cues in a relatively large size and wide viewing angle. In the dynamic CIH display, the scanning system combined with the coarse integral optics efficiently utilizes the SLM's large bandwidth to create a holographic video. It is expected that a single device, rather than multiple devices, may have more immediate potential for increasing a dynamic hologram's effective information content (e.g., to achieve 10 billion pps). The CIH system described also uses different vertical and horizontal viewing angles to achieve more efficient use of the available information. The reconstructed holographic image is also a real image holding a definitive position in space and accessible for interactive applications.

The layer-based holographic rendering algorithm working in conjunction with the dynamic CIH display enabled the inventors (during testing/prototyping) to calculate the holograms with all appropriate depth cues including full parallax, accommodation cues, occlusion, and perspective. The rendering algorithm's rapid speed reduces the computation time for a full holographic with all the relevant 3D cues from theoretically hours or even days down to seconds, even when rendered from a single graphic card. This should lead to the development of CIH display systems with rendering abilities supporting real time holographic video.

In summary, a new holographic display structure was described that may be thought of as dynamic coarse integral holography and that may be used to create a video frame rate, full color, full parallax holographic video display. This structure uses opto-mechanical scanning and coarse integral optics for efficiently reorganizing information from a low SBP high-bandwidth SLM to create dynamic holograms with a large SBP at video rates. An overall hologram frame, for example, that included 141.6 Megapixels for each of three colors was generated and presented with a CIH display at a frame rate of 23.33 fps (equal to a rate of 10 billion bps) from a single display device. In some implementations, a multi-view, multi-layer holographic rendering algorithm works in conjunction with the optical system to further optimize the use of the display's available bandwidth by removing visual and object redundancies, while providing important view dependent cues such as occlusion/disocclusion and being conducive to parallel computation (such as on GPUs).

We claim:

1. A scanning coarse integral holographic display, comprising:
   a scanning relay comprising a spatial light modulator displaying elemental holograms of a 3D scene, holographic lenslets provided via display on the spatial light modulator, and a scanner assembly; and
   a coarse integral optics assembly positioned between the scanning relay and a viewing space for the holographic display,
   wherein each of the holographic lenslets is paired with one of the elemental holograms,
   wherein the scanner assembly directs each of the elemental holograms and a paired one of the holographic lenslets onto a plane within the coarse integral optics assembly to provide a displayed lenslet and image array, and
   wherein the coarse integral optics assembly is adapted to combine the elemental holograms into a single hologram viewable in a hologram image plane.

2. The holographic display of claim 1, wherein the scanner assembly includes a resonant scanner to provide vertical dither.

3. The holographic display of claim 2, wherein the scanner assembly includes an X-Y scanner receiving output light of the resonant scanner and scanning the elemental holograms and the holographic lenslets and wherein the scanner assembly further includes at least one relay lens disposed between the resonant scanner and the X-Y scanner.

4. The holographic display of claim 1, wherein the scanner assembly directs the elemental holograms and the holographic lenslets following a boustrophedon scanning pattern.

5. The holographic display of claim 1, wherein the elemental holograms comprise a set of red, green, and blue holograms for each view of the single holograms.

6. The holographic display of claim 5, wherein the spatial light modulator is illuminated with a light source providing view sequential color synchronized with the display of the red, green, and blue holograms on the spatial light modulator.

7. A scanning coarse integral holographic display, comprising:
- a scanning relay comprising a spatial light modulator;
- a controller operating the spatial light modulator to display sub-holograms of a 3D scene and to concurrently display an array of holographic lenslets with each of the holographic lenslets paired with one of the sub-holograms; and
- a coarse integral optics assembly comprising a pair of transform lenses positioned between the scanning relay and a viewing space for the holographic display,
- wherein the scanning relay further includes a scanner assembly operable to direct each of the sub-holograms and a paired one of the holographic lenslets onto a plane between a pair of transform lenses, and
- wherein the coarse integral optics assembly combines with the pair of the transform lenses the plurality of sub-holograms into a single hologram viewable in a hologram image plane in the viewing space.

8. The holographic display of claim 7, wherein each of the holographic lenslets is an attached holographic lenslet that is computed and attached to the paired one of the sub-holograms.

9. The holographic display of claim 7, wherein the scanner assembly includes a resonant scanner providing vertical dither.

10. The holographic display of claim 7, wherein the scanner assembly includes a resonant scanner providing a larger mirror, a larger scan angle, or a faster scan frequency.

11. The holographic display of claim 10, wherein the scanner assembly further includes an X-Y scanner receiving output light of the resonant scanner and scanning the sub-holograms and the holographic lenslets onto the plane between the pair of the transform lenses.

12. The holographic display of claim 7, wherein the controller operates the scanner assembly to perform boustrophedic scanning.

13. The holographic display of claim 7, wherein the sub-holograms comprise a set of red, green, and blue holograms for each view of the single holograms and wherein the spatial light modulator is illuminated with a light source providing overlapping view sequential color synchronized with the display of the red, green, and blue holograms on the spatial light modulator.

* * * * *